(12) United States Patent
Wang et al.

(10) Patent No.: US 12,223,872 B2
(45) Date of Patent: Feb. 11, 2025

(54) FOLDABLE ELECTRONIC DEVICE DISPLAY METHOD AND FOLDABLE ELECTRONIC DEVICE HAVING A SCREEN NON-LOCK STATE

(71) Applicant: Honor Device Co., Ltd., Shenzhen (CN)

(72) Inventors: Shilei Wang, Shenzhen (CN); Hepu Cao, Shenzhen (CN); Peng Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/277,062

(22) PCT Filed: Dec. 20, 2022

(86) PCT No.: PCT/CN2022/140509
§ 371 (c)(1),
(2) Date: Aug. 11, 2023

(87) PCT Pub. No.: WO2023/130955
PCT Pub. Date: Jul. 13, 2023

(65) Prior Publication Data
US 2024/0127729 A1    Apr. 18, 2024

(30) Foreign Application Priority Data

Jan. 4, 2022    (CN) .......................... 202210005112.0
Jul. 22, 2022    (CN) .......................... 202210866056.X

(51) Int. Cl.
*G09G 3/00*    (2006.01)
*H04M 1/02*    (2006.01)

(52) U.S. Cl.
CPC .......... *G09G 3/035* (2020.08); *H04M 1/0214* (2013.01); *H04M 1/0268* (2013.01)

(58) Field of Classification Search
CPC .. G09G 3/035; H04M 1/0214; H04M 1/0268; G06F 1/1677; G06F 1/3278; G01R 33/07; H04B 1/3888
See application file for complete search history.

(56) References Cited

U.S. PATENT DOCUMENTS

2014/0306553 A1*  10/2014  Lee ..................... G06F 1/3278
                                                              307/326
2014/0318994 A1*  10/2014  Lee ..................... H04M 1/0214
                                                              206/37
(Continued)

FOREIGN PATENT DOCUMENTS

CN    104104784 A    10/2014
CN    209965484 U    1/2020
(Continued)

*Primary Examiner* — Richard J Hong
(74) *Attorney, Agent, or Firm* — Leydig, Voit & Mayer, Ltd.

(57) ABSTRACT

Embodiments of this application provide an electronic device display method and an electronic device. The electronic device includes a foldable body, an outer screen, and an inner screen, and the method includes: when the foldable body is in a folded state, detecting whether a protective cover approaches the outer screen and reaches a preset position with respect to the outer screen; if the protective cover reaches the preset position with respect to the outer screen, when the preset condition is met, determining whether the foldable body is switched to a non-folded state; and if the foldable body is switched to the non-folded state, controlling the electronic device to be in a screen non-locked state. That the preset condition is met includes at least being within a preset time after the protective cover reaches the preset position.

19 Claims, 17 Drawing Sheets

(56) References Cited

U.S. PATENT DOCUMENTS

| | | | |
|---|---|---|---|
| 2015/0061648 A1* | 3/2015 | Park | G01R 33/07 |
| | | | 324/207.2 |
| 2015/0097558 A1* | 4/2015 | Jin | H04B 1/3888 |
| | | | 324/226 |
| 2015/0154935 A1 | 6/2015 | Won | |
| 2015/0278529 A1* | 10/2015 | Cho | G06F 1/1677 |
| | | | 345/668 |
| 2015/0378422 A1* | 12/2015 | Sun | G06F 1/1677 |
| | | | 361/679.01 |
| 2020/0174522 A1 | 6/2020 | Lim | |
| 2020/0379511 A1 | 12/2020 | Jin et al. | |
| 2021/0398465 A1 | 12/2021 | Kim et al. | |
| 2022/0350374 A1 | 11/2022 | Tian et al. | |

FOREIGN PATENT DOCUMENTS

| | | |
|---|---|---|
| CN | 110798568 A | 2/2020 |
| CN | 111610818 A | 9/2020 |

* cited by examiner

FOLDABLE ELECTRONIC DEVICE DISPLAY METHOD AND FOLDABLE ELECTRONIC DEVICE HAVING A SCREEN NON-LOCK STATE

CROSS-REFERENCE TO RELATED APPLICATIONS

This application is a national stage of International Application No. PCT/CN2022/140509, filed on Dec. 20, 2022, which claims priority to Chinese Patent Application No. 202210005112.0, filed on Jan. 4, 2022, and Chinese Patent Application No. 202210866056.X, filed on Jul. 22, 2022, all of which are hereby incorporated by reference in their entireties.

TECHNICAL FIELD

This application relates to an electronic device display method and an electronic device.

BACKGROUND

With rapid development of the mobile phone terminal industry, foldable mobile phones have become a new development trend. The foldable mobile phone usually includes an outer screen and an inner screen. To protect the foldable mobile phone, the foldable mobile phone is usually equipped with a protective case. The protective case may cover a surface of the outer screen when the foldable mobile phone is in a folded state. When using the foldable mobile phone, a user is accustomed to first viewing information on the outer screen, then covering the surface of the outer screen with the protective case, and then opening the inner screen. A flip cover mode is triggered when the protective case covers the surface of the outer screen. In the flip cover mode, an unlocking function is enabled on the foldable mobile phone. Therefore, unlocking is further required to open the inner screen, affecting operation efficiency and use experience of the user.

SUMMARY

This application provides an electronic device display method and an electronic device, so that a non-lock screen can be directly entered when a user switches from an outer screen to an inner screen, thereby improving browsing efficiency and use experience of the user.

An electronic device display method is provided. The electronic device includes a foldable body, an outer screen, and an inner screen, the outer screen and the inner screen are respectively located on two opposite surfaces of the foldable body, and the method includes:

when the foldable body is in the folded state, detecting whether a protective cover approaches the outer screen and reaches a preset position with respect to the outer screen;

if the protective cover reaches the preset position with respect to the outer screen, when a preset condition is met, determining whether the foldable body is switched to the non-folded state; and if the foldable body is switched to the non-folded state, controlling the electronic device to be in a screen non-locked state, where the preset condition includes at least being within a preset time after the protective cover reaches the preset position.

In this embodiment, when a user covers the outer screen with the protective cover, and the foldable body is switched from the folded state to the non-folded state, the user probably needs to browse through the outer screen. Therefore, when the user opens the inner screen, the user does not need to perform unlocking, and the electronic device directly enters the screen non-locked state, so that browsing efficiency and browsing experience of the user are improved.

In an embodiment, a signal transmitting component is disposed on the protective cover, and a signal sensing component is disposed on the outer screen; and when the protective cover approaches the outer screen, and the signal sensing component senses a signal transmitted by the signal transmitting component, it is determined that the protective cover reaches the preset position.

In an embodiment, if the foldable body is not switched to the non-folded state within the preset time after the protective cover reaches the preset position, the electronic device is controlled to be in a screen locked state.

In an embodiment, that the preset condition is met further includes: the electronic device is in the screen non-locked state.

In this embodiment, when it is determined that the electronic device is in the screen non-locked state, it indicates that the user browses the outer screen when the electronic device is in the screen non-locked state. Based on a use habit of the user, if the protective cover covers a surface of the outer screen in this case, it indicates that the user may perform an operation of unfolding the inner screen next, and further browse displayed content of the outer screen through the inner screen. Therefore, a processor may invoke a function of delaying screen locking, and determine, based on a next action of the user, whether to lock a screen of the mobile phone.

In an embodiment, if the electronic device is in a screen locked state, the electronic device is controlled to remain in the screen locked state.

In an embodiment, if the electronic device is in the screen non-locked state, the outer screen displays a non-lock screen; and if it is determined that the foldable body is switched to the non-folded state, the inner screen is controlled to continue to display the non-lock screen.

In this embodiment, browsing continuity experience when the user switches from the outer screen to the inner screen can be improved.

In an embodiment, that the preset condition is met further includes: a posture of the foldable body is in a non-horizontal state.

In this embodiment, when the user normally views the electronic device, the electronic device is tilted with respect to a horizontal plane in most cases. If the foldable mobile phone is horizontally placed, it indicates that the user may not view the inner screen next. Therefore, determining accuracy can be improved.

In an embodiment, it is determined whether an absolute value of a change amount of a roll angle of the foldable body is greater than a first preset angle; and if the absolute value of the change amount of the roll angle of the foldable body is greater than the first preset angle, it is determined that the posture of the foldable body is in the non-horizontal state, where a rotation axis corresponding to the roll angle is parallel to a folding axis of the foldable body.

In this embodiment, if the absolute value of the roll angle of the foldable body is greater than the first preset angle, it indicates that the user is probably preparing to unfold the inner screen. Therefore, it may be considered that the user is to open the inner screen next to continue browsing.

In an embodiment, before it is determined whether the absolute value of the change amount of the roll angle of the foldable body is greater than the first preset angle, the method further includes:
  determining whether an absolute value of a pitch angle of the foldable body is less than the second preset angle, or determining whether a component value of an acceleration sensor in the foldable body in a gravity direction is less than a preset threshold; and
  if the absolute value of the pitch angle of the foldable body is less than the second preset angle, or the component value of the acceleration sensor in the foldable body in the gravity direction is less than the preset threshold, performing the step of determining whether the absolute value of the change amount of the roll angle of the foldable body is greater than the first preset angle, where a rotation axis corresponding to the pitch angle is perpendicular to the rotation axis corresponding to the roll angle.

In this embodiment, if the absolute value of the pitch angle of the foldable body is less than the second preset angle, or the component of the acceleration sensor in the foldable body in the gravity direction is less than the preset threshold, it indicates that the roll angle obtained in this case can relatively accurately reflect the posture of the foldable body. Therefore, an intention of the user may be further determined from the posture of the foldable body.

In an embodiment, if the absolute value of the pitch angle of the foldable body is not less than the second preset angle, or the component value of the acceleration sensor in the foldable body in the gravity direction is not less than the preset threshold, it is determined, within the preset time after the protective cover reaches the preset position, whether the foldable body is switched to the non-folded state.

In an embodiment, after the protective cover reaches the preset position with respect to the outer screen, the method includes: controlling the outer screen to display a small-window interface.

In an embodiment, after it is determined, within the preset time after the protective cover reaches the preset position, that the foldable body is switched to the non-folded state, the method further includes: controlling the outer screen to exit the small-window interface.

In this embodiment, if the user indeed does not open the inner screen to continue browsing, the user may also quickly browse information such as time and a short messaging service message through a small window on the outer screen, so that browsing continuity experience of the user is improved.

An electronic device display method is provided. The electronic device includes a foldable body, an outer screen, and an inner screen, the outer screen and the inner screen are respectively located on two opposite surfaces of the foldable body, and when the foldable body is in a folded state, and the outer screen displays a non-lock screen, the method includes:
  detecting whether the protective cover approaches the outer screen and reaches a preset position with respect to the outer screen;
  if the protective cover reaches the preset position with respect to the outer screen, determining, within a preset time after the protective cover reaches the preset position, whether
    the foldable body is switched to the non-folded state; and
    if the foldable body is switched to the non-folded state, controlling the inner screen to continue to display the non-lock screen.

An embodiment of this application further provides an electronic device, including:
  a foldable body, an outer screen, and an inner screen, where the outer screen and the inner screen are respectively located on two opposite surfaces of the foldable body; and
  a processor and a memory configured to store executable instructions of the processor, where when the processor is configured to execute the instructions, the electronic device is enabled to implement the described method.

An embodiment of this application further provides a chip system, configured to execute a computer program stored in a memory, to perform the described display method.

An embodiment of this application further provides a computer-readable storage medium. The computer-readable storage medium includes a computer program, and when the computer program runs on an electronic device, the electronic device is enabled to perform the described display method.

DESCRIPTION OF EMBODIMENTS

The following clearly describes the technical solutions in embodiments of this application with reference to the accompanying drawings in embodiments of this application. Clearly, the described embodiments are merely some rather than all of embodiments of this application. Based on embodiments of this application, all other embodiments obtained by a person of ordinary skill in the art without creative efforts fall within the protection scope of this application.

Terms "first" and "second" are merely used for description purposes, and shall not be understood as indicating or implying relative importance or implicitly indicating a quantity of technical features indicated. Therefore, a feature defined by "first" or "second" may explicitly or implicitly include one or more such features. In the descriptions of this application, unless otherwise specified, "a plurality of" means two or more.

With popularization of intelligent devices and development of a communication technology, a form of an electronic terminal product is also constantly changing.

As an electronic terminal product, a mobile phone integrates functions such as daily communication, information collection, and leisure and entertainment, and has become an essential life necessity of people. A size of the mobile phone is usually designed to make it convenient for a user to hold the mobile phone with one hand. This requires that a width of the mobile phone should not be excessively large, and therefore an area of a display screen of the mobile phone should not be excessively large, affecting browsing experience of the user. To enable the user to conveniently use normal functions of the mobile phone while enjoying comfort and convenience of a large screen, foldable mobile phones with folding and unfolding functions start to be popular among users.

Figure 1:
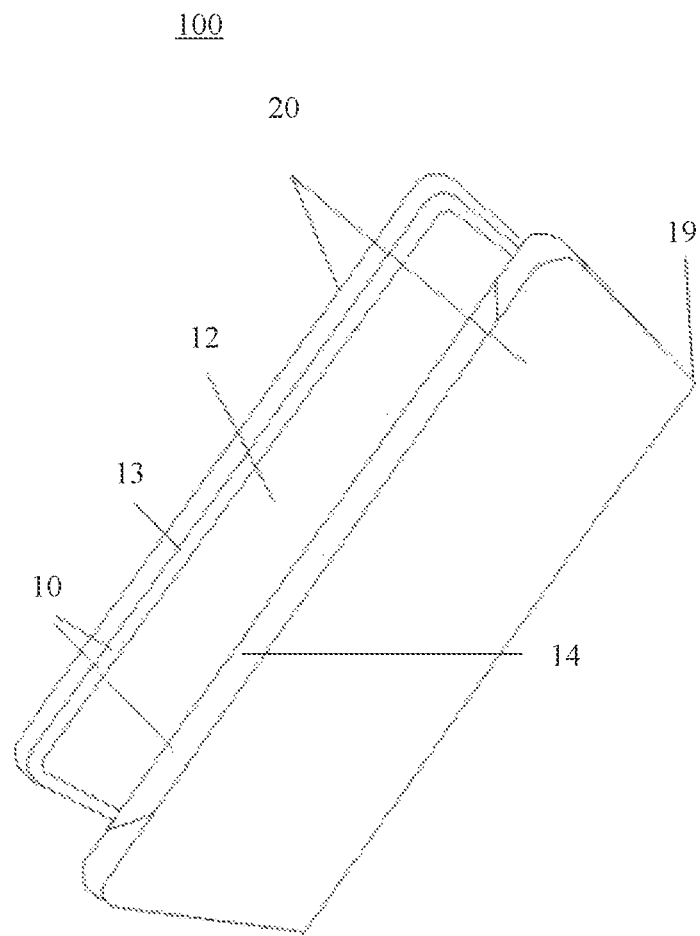
FIG. 1 is a schematic diagram of an electronic device according to an embodiment of this application.

Referring to FIG. 1, an embodiment of this application provides a foldable mobile phone 100. The foldable mobile phone 100 may include a foldable body 10. The foldable body 10 is foldable. The foldable body 10 may include a first body 13, a second body 14, and a rotating shaft 19. The first body 13 and the second body 14 are connected through a rotating shaft 19. The first body 13 and the second body 14 can rotate about the rotating shaft 19. The first body 13 and the second body 14 may implement a folding function by using the rotating shaft 19.

Figure 2:
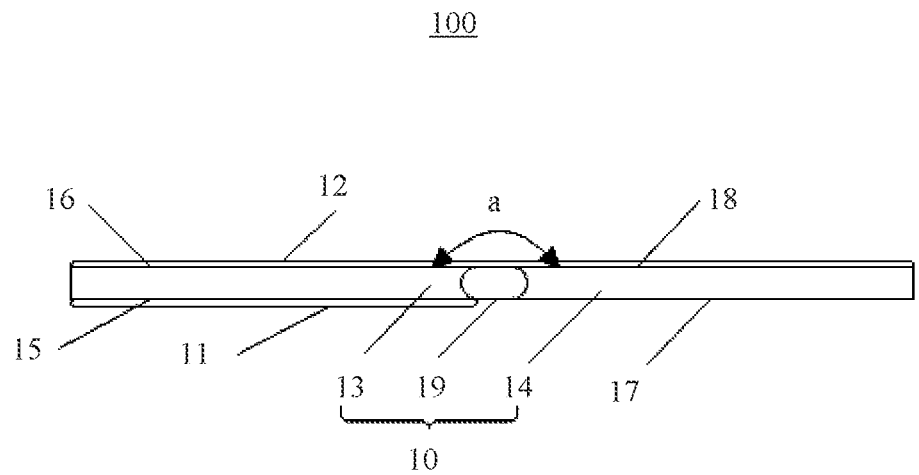
FIG. 2 is a side view of an electronic device in an unfolded state according to an embodiment of this application.

Referring to FIG. 2, the first body 13 may have a first surface 15 and a second surface 16 that are opposite to each other. The second body 14 may have a third surface 17 and a fourth surface 18 that are opposite to each other. An outer screen 11 may be disposed on at least one of the first surface 15 and the third surface 17. An inner screen 12 may cover the second surface 16 and the fourth surface 18. The foldable mobile phone 100 may have an unfolded state, a folded state, and a bracket state. Correspondingly, the foldable body 10 may also have an unfolded state, a folded state, and a bracket state.

When the foldable mobile phone 100 is in the folded state, the foldable body 10 may be folded toward a side on which the inner screen 12 is located. The outer screen 11 located on the first surface 15 or the third surface 17 is exposed on a surface of the foldable mobile phone 100. In other words, the outer screen 11 faces away from a folding direction of the foldable body 10. When the foldable mobile phone 100 is in the folded state, a user may browse content displayed on the outer screen, and the inner screen 12 is folded and hidden. A display area of the inner screen 12 may be greater than a display area of the outer screen 11. In some embodiments, the inner screen 12 may alternatively be located only on the second surface 16 or the fourth surface 18.

When the foldable mobile phone 100 is in the unfolded state, the inner screen 12 may be used for display. In an embodiment, the inner screen 12 may be a flexible screen. Therefore, when an angle between the first body 13 and the second body 14 changes, the inner screen 12 may be folded.

In an embodiment, the foldable mobile phone may be defined as being in the unfolded state when the included angle between the first body 13 and the second body 14 is greater than a preset angle. For example, the preset angle is 150°. To be specific, when the included angle between the first body 13 and the second body 14 falls between 150° and 180°, it may be considered that the foldable mobile phone 100 is in the unfolded state. Further referring to FIG. 2, in this case, an included angle a between the first body 13 and the second body 14 is 180°, in other words, the foldable mobile phone 100 is in a fully-unfolded state. When the foldable mobile phone 100 is in the fully-unfolded state, the first surface 15 and the third surface 17 may be located on a same plane. The second surface 16 and the fourth surface 18 may be located on a same plane.

Figure 3:
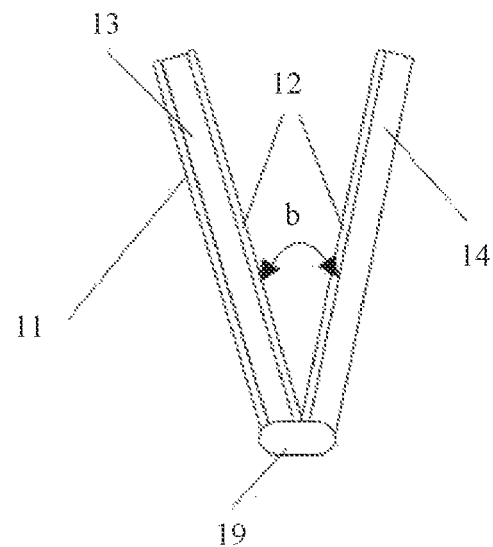
FIG. 3 is a schematic diagram of an electronic device folded by an angle according to an embodiment of this application.

When the included angle between the first body 13 and the second body 14 falls between 0° and 45°, it may be considered that the foldable mobile phone 100 is in the folded state. As shown in FIG. 3, in this case, an included angle b between the first body 13 and the second body 14 is approximately 30°, in other words, the foldable mobile phone 100 is in the folded state.

Figure 4:
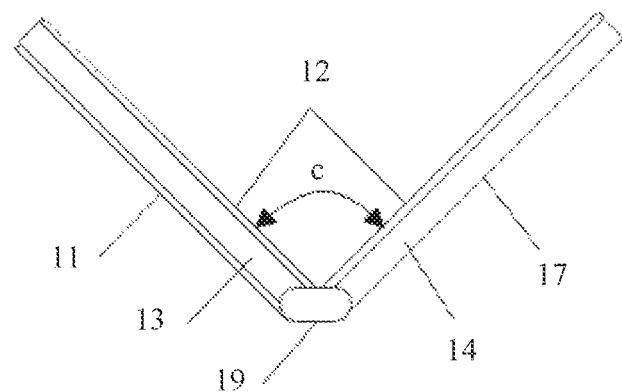
FIG. 4 is a schematic diagram of an electronic device folded by an angle according to an embodiment of this application.

When the included angle between the first body 13 and the second body 14 falls between 45° and 150°, it may be considered that the foldable mobile phone 100 is in the bracket state. As shown in FIG. 4, when an included angle c between the first body 13 and the second body 14 is approximately 100°, the foldable mobile phone 100 is in the bracket state. When the foldable mobile phone 100 is in the bracket state, one of the first body 13 and the second body 14 may provide a support on a plane as a base, and the other may be used for display as a display screen.

In an embodiment, the foldable mobile phone 100 may alternatively be defined as being in the folded state when the included angle between the first body 13 and the second body 14 is 0°. When the included angle between the first body 13 and the second body 14 is greater than 0°, the foldable mobile phone 100 is in the unfolded state. When the included angle between the first body 13 and the second body 14 is 0°, it may be considered that the foldable mobile phone 100 is in a fully-folded state. When the foldable mobile phone 100 is in the fully-folded state, the second surface 16 and the fourth surface 18 may be close to and in contact with each other.

Figure 5:
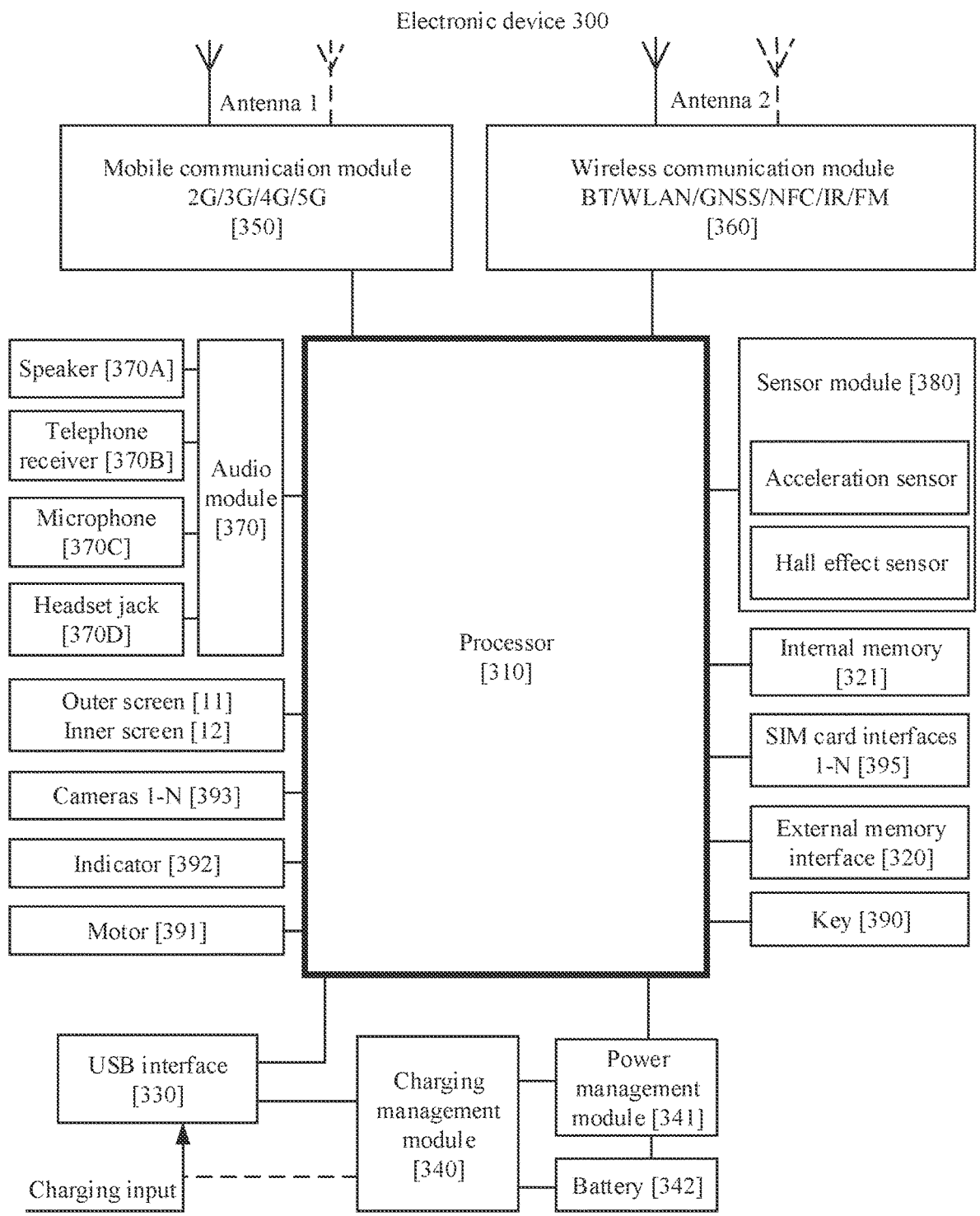
FIG. 5 is a schematic diagram of modules of an electronic device according to an embodiment of this application.

Referring to FIG. 5, in some embodiments, the foldable mobile phone 100 may further include an external memory interface 320, an internal memory 321, a universal serial bus (USB) interface 330, a charging management module 340, a power management module 341, a battery 342, an antenna 1, an antenna 2, a mobile communication module 350, a wireless communication module 360, an audio module 370, a speaker 370A, a telephone receiver 370B, a microphone 370C, a headset jack 370D, a sensor module 380, a key 390, a motor 391, an indicator 392, a camera 393, a display screen 394, a subscriber identity module (SIM) card interface 395, and the like.

The sensor module 380 may include a pressure sensor, a gyro sensor, a barometric pressure sensor, a magnetic sensor, a distance sensor, an optical proximity sensor, a temperature sensor, a touch sensor, an ambient light sensor, a bone conduction sensor, a Hall effect sensor, an acceleration sensor, and the like.

It may be understood that structures illustrated in embodiments of this application do not constitute a specific limitation on the foldable mobile phone 100. In some other embodiments of this application, the foldable mobile phone 100 may include more or fewer components than those shown in the figure, or some components may be combined, or some components may be split, or components may be arranged in different manners. The components shown in the figure may be implemented by using hardware, software, or a combination of software and hardware.

A processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, a neural-network processing unit (NPU), a micro controller unit (MCU), and/or the like. Different processing units may be independent components, or may be integrated into one or more processors.

The controller may be a nerve center and a command center of the foldable mobile phone 100. The controller may generate an operation control signal based on instruction operation code and a timing signal, to complete control of instruction fetching and instruction execution.

The memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access and reduces a waiting time of the processor 310, thereby improving system efficiency.

In some embodiments, the processor 310 may include one or more interfaces. The interfaces may include an inter-integrated circuit (I2C) interface, a serial peripheral interface (SPI), an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that the interface connection relationships between the modules depicted in this embodiment of this application are merely illustrative descriptions, and do not constitute a structural limitation on the foldable mobile phone 100. In some other embodiments of this application, the foldable mobile phone 100 may alternatively use an interface connection manner different from that in the foregoing embodiment, or use a combination of a plurality of interface connection manners.

The charging management module 340 is configured to receive charging input from a charger. The power management module 341 is configured to connect to the battery 342, the charging management module 340, and the processor 310. The power management module 341 receives input from the battery 342 and/or the charging management module 340, to supply power to the processor 310, the internal memory 321, an external memory, the display screen 394, the camera 393, the wireless communication module 360, and the like. In some other embodiments, the power management module 341 and the charging management module 340 may alternatively be disposed in a same component.

A wireless communication function of the foldable mobile phone 100 may be implemented by using the antenna 1, the antenna 2, the mobile communication module 350, the wireless communication module 360, the modem processor, the baseband processor, and the like. The antenna 1 and the antenna 2 are configured to transmit and receive an electromagnetic wave signal. Each antenna in the foldable mobile phone 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 350 may provide a wireless communication solution that includes 2G/3G/4G/5G and the like and that is applied to the foldable mobile phone 100. The wireless communication module 360 may provide a wireless communication solution that includes a wireless local area network (WLAN) (for example, a Wi-Fi network), Bluetooth (BT), a global navigation satellite system (GNSS), frequency modulation (FM), NFC, an infrared (IR) technology, and the like and that is applied to the foldable mobile phone 100.

The foldable mobile phone 100 implements a display function by using the GPU, the outer screen 11, the inner screen 12, the application processor, and the like. The GPU is an image processing microprocessor, and is connected to the outer screen 11, the inner screen 12, and the application processor. The GPU is configured to perform mathematical and geometric calculation for graphics rendering. The processor 310 may include one or more GPUs that execute program instructions to generate or change display information.

The mobile phone 100 may implement a photographing function by using the ISP, the camera 393, the video codec, the GPU, the outer screen 11, the inner screen 12, the application processor, and the like. The ISP is configured to process data fed back by the camera 393. The camera 393 is configured to capture a still image or a video. In some embodiments, the foldable mobile phone 100 may include one or N cameras 393, where N is a positive integer greater than 1.

The NPU is a neural-network (NN) computing processor that quickly processes input information by referring to a biological neural network structure, for example, by referring to a transmission mode between human brain neurons, and may further perform self-learning continuously. The NPU may be used to implement an application such as intelligent cognition of the foldable mobile phone 100, for example, protector status recognition, image repair, image recognition, face recognition, speech recognition, and text understanding.

The external memory interface 320 may be configured to connect to an external memory card such as a Micro SD card, to extend a storage capability of the foldable mobile phone 100. The external memory card communicates with the processor 310 through the external memory interface 320, to implement a data storage function, for example, to store files such as music and a video in the external memory card.

The internal memory 321 may be configured to store computer-executable program code. The computer-executable program code includes instructions. The processor 310 runs the instructions stored in the internal memory 321, to perform various function applications and data processing of the foldable mobile phone 100. The internal memory 321 may include a program storage region and a data storage region. The program storage region may store an operating system, an application required by at least one function (for example, a sound playback function or an image playback function), and the like. The data storage region may store data (for example, audio data and an address book) and the like created when the foldable mobile phone 100 is used. In addition, the internal memory 321 may include a high-speed random access memory, and may further include a non-volatile memory, for example, at least one magnetic disk storage component, a flash memory device, or a universal flash storage (UFS).

The foldable mobile phone 100 may implement an audio function such as music playback or recording by using the audio module 370, the speaker 370A, the telephone receiver 370B, the microphone 370C, the headset jack 370D, the application processor, and the like.

The touch sensor is also referred to as a "touch panel (TP)". The touch sensor may be disposed on the outer screen 11 and the inner screen 12. The touch sensor, the outer screen 11, and the inner screen 12 constitute a touchscreen, also referred to as a "touch control screen". The touch sensor is configured to detect a touch operation performed on or near the touch sensor. The touch sensor may transfer the detected touch operation to the application processor to determine a type of a touch event. Visual output related to the touch operation may be provided by using the outer screen 11 and the inner screen 12. In some other embodiments, the touch sensor may alternatively be disposed on a surface of the foldable mobile phone 100, and is located on a position different from those of the outer screen 11 and the inner screen 12.

The key 390 includes a power on/off key, a volume key, and the like. The motor 391 may generate a vibration prompt. The indicator 392 may be an indicator light, and may be configured to indicate a charging status and a power change, or may be configured to indicate a message, a missed call, a notification, or the like. The SIM card interface 395 is configured to connect to a SIM card.

Figure 6:
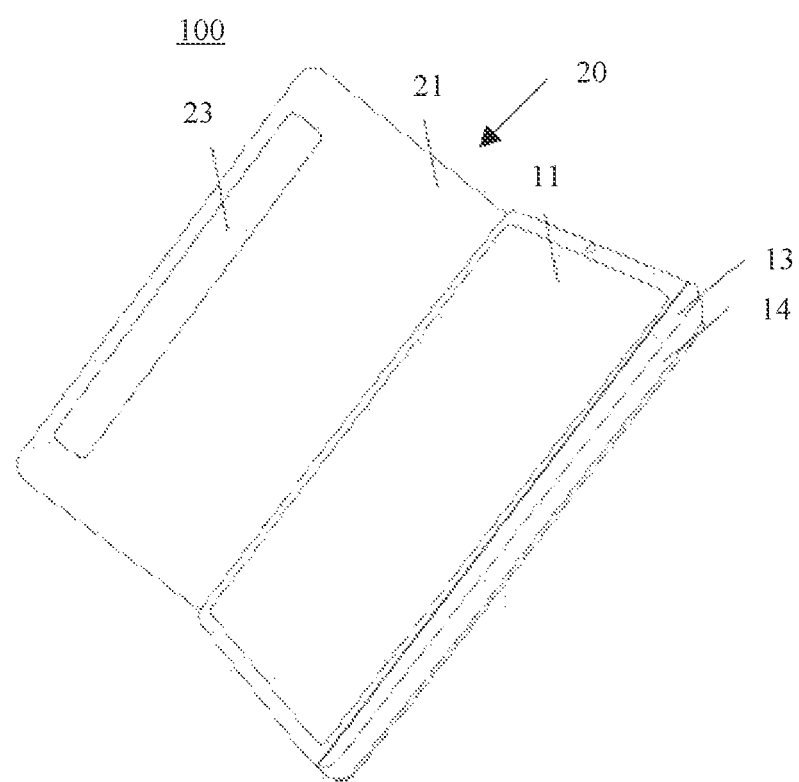
FIG. 6 is a schematic diagram of a protective cover of an electronic device in an open state according to an embodiment of this application.
Figure 7:
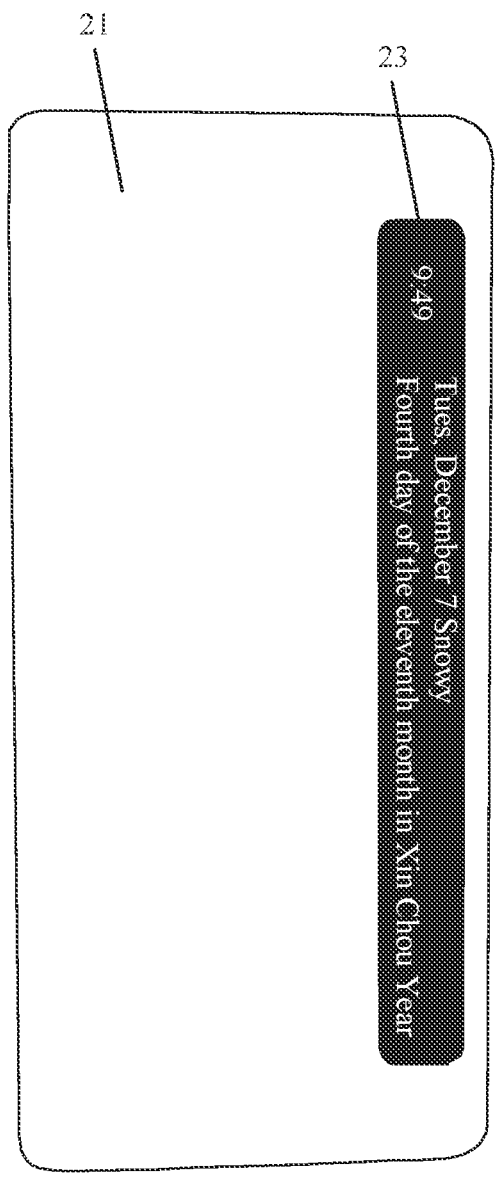
FIG. 7 is a schematic diagram of a protective cover of an electronic device in a flip cover mode according to an embodiment of this application.

Referring to FIG. 6 and FIG. 7, in some use scenarios, when the user uses the foldable mobile phone 100, to provide protection for the foldable mobile phone 100 or to improve a hand feeling of holding the foldable mobile phone 100, a protective case 20 is usually configured for the foldable mobile phone 100. It may be understood that the protective case 20 may be a self-contained accessory of the foldable mobile phone 100, or may be a product selected and purchased by the user.

Referring to FIG. 6, when the foldable mobile phone 100 is in the folded state, the protective case 20 may be configured to cover an outer surface of the foldable mobile phone 100. The protective case 20 may include a protective cover 21. The protective cover 21 may be configured to protect the outer screen 11 of the foldable mobile phone 100. When the user uses the outer screen 11, the user may open the protective cover 21, and may perform an operation on the outer screen 11. When the user does not use the outer screen 11, the protective cover 21 may cover a surface of the outer screen 11. When the foldable mobile phone 100 is in the folded state, the protective cover 21 may be used as a protective layer to cover the surface of the outer screen 11, to avoid scratching the outer screen 11 when the foldable mobile phone 100 is placed in a purse or a pocket. When the foldable mobile phone 100 is in the unfolded state, and the user browses through the inner screen 12, the protective cover 21 may also cover the surface of the outer screen 11. In this case, a hand of the user may hold the foldable mobile phone 100 by using the protective cover 21, to avoid directly touching the outer screen 11. The protective cover 21, the first body 13, and the second body 14 may rotate relatively independently about a rotation axis of the rotating shaft 19. In an embodiment, the first body 13 and the second body 14 may also have a function of synchronously rotating about the rotating shaft 19.

Further referring to FIG. 6 and FIG. 7, a window 23 may be disposed on the protective cover 21. Referring to FIG. 7, when the protective cover 21 covers the outer screen 11, the foldable mobile phone 100 may enable a flip cover mode. The flip cover mode may include a small-window mode. In the small-window mode, the outer screen 11 may display a small-window interface. When the protective cover 21 covers the outer screen 11, the small-window interface is exposed from the window 23, so that the user can browse information. The small-window interface may display information such as time, a date, and an email reminder.

A size of the small-window interface may be adjusted based on a position of the window 23 in the protective cover 21 and a size of the window 23. Content displayed in the small-window interface may be set as required. A shape of a small window may also be adjusted as required. As shown in FIG. 6 and FIG. 7, the small window may be long-strip-shaped. In some embodiments, the small window may alternatively be a circle, an oval, or the like.

Figure 8:
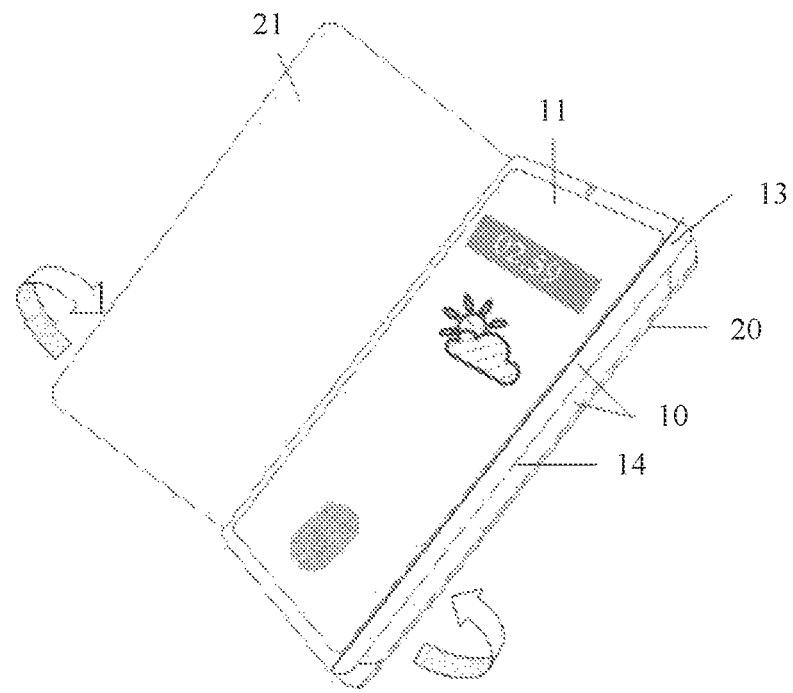
FIG. 8 is a schematic diagram of a state in which a protective cover of an electronic device is to close according to an embodiment of this application.

Referring to FIG. 8, after the user lifts the protective cover 21 from the surface of the outer screen 11, the outer screen 11 may be switched from the small-window interface to a lock screen. The user may perform an unlocking operation on the outer screen 11. The unlocking operation may include performing fingerprint unlocking, pattern unlocking, password unlocking, or graphics unlocking on the outer screen 11. An unlocking manner is not limited herein. In an embodiment, when the user lifts the protective cover 21, the foldable mobile phone may alternatively automatically exit a screen locked state. When the foldable mobile phone is in the folded state, the inner screen 12 may be in a power-off and screen-off state.

In an embodiment, after the foldable mobile phone 100 enables the flip cover mode, the foldable mobile phone 100 may invoke a screen locking function while the outer screen 11 displays the small-window interface.

For example, the foldable mobile phone 100 may trigger the flip cover mode in the following manner:

A signal transmitting component (not shown in the figure) may be disposed on the protective cover 21, and a signal sensing component (not shown in the figure) may be disposed on the first body 13 or the outer screen 11. When the protective cover 21 approaches and covers the outer screen 11, so that the signal sensing component senses a signal transmitted by a signal transmitter, the signal sensing component may send an interrupt trigger signal to the processor of the foldable mobile phone 100. The processor may invoke the screen locking function based on the interrupt trigger signal. In this case, the outer screen 11 may display the lock screen, and the inner screen 12 may be in the power-off and screen-off state.

In an embodiment, a position at which the signal sensing component can sense the signal transmitted by the signal transmitter may be a relative position of the signal transmitting component and the signal sensing component when the protective cover 21 covers the outer screen 11. Alternatively, a position at which the signal sensing component can sense the signal transmitted by the signal transmitter may be a position at which the signal sensing component can just sense the signal transmitted by the signal transmitting component and at which the protective cover 21 and the outer screen 11 are not completely attached, in other words, there is still a specific angle between the protective cover 21 and the outer screen 11 when the protective cover 21 approaches the outer screen 11.

In an embodiment, the signal transmitting component may include a magnet (not shown in the figure) disposed on the protective cover 21. The signal sensing component may be a Hall effect sensor (not shown in the figure) disposed on the outer screen 11. In an embodiment, the Hall effect sensor may be disposed at an upper left corner of the outer screen 11. When the protective cover 21 covers the outer screen 11, a position of the magnet is opposite to that of the Hall effect sensor disposed on the outer screen 11. When the protective cover 21 approaches the outer screen 11, the Hall effect sensor may detect a change of a magnetic field. When a magnetic flux detected by the Hall effect sensor reaches a magnetic flux threshold, the Hall effect sensor may send an interrupt trigger signal to the processor.

In some embodiments, when the user needs to browse the outer screen 11, the user usually lifts the protective cover 21. In this case, the signal transmitting component may send a signal to the signal sensing component, and the processor may control, based on the signal received by the signal sensing component, the foldable mobile phone 100 to exit the screen locked state. In an embodiment, the foldable mobile phone 100 may alternatively be set to a mode in which the user manually unlocks the foldable mobile phone 100. In other words, after lifting the protective cover 21, the user may manually unlock the foldable mobile phone 100.

When the user uses the foldable mobile phone 100, the following cases usually occur:

Case 1: The foldable mobile phone 100 is in the screen locked state when not in use. When there is an information reminder of applications such as Email, WeChat, or QQ on the foldable mobile phone 100, a pop-up window, a vibration, or a voice prompt occurs on the foldable mobile phone 100. The user usually lifts the protective cover 21, and simply browses information content through the outer screen 11.

Further referring to FIG. 8, the foldable mobile phone 100 is still in the screen locked state after the protective cover 21 is lifted. If a further operation or further browsing needs to be performed by using the inner screen 12, the inner screen 12 needs to be opened and unlocking needs to be performed to perform a next operation.

Case 2: When the user unlocks the foldable mobile phone 100, and then browses content such as a video or a website or reads a book, a report, or a picture through the outer screen 11, if an image displayed on the outer screen 11 is relatively small and affects browsing experience, the user further switches to the inner screen 12 for further browsing.

Figure 9:
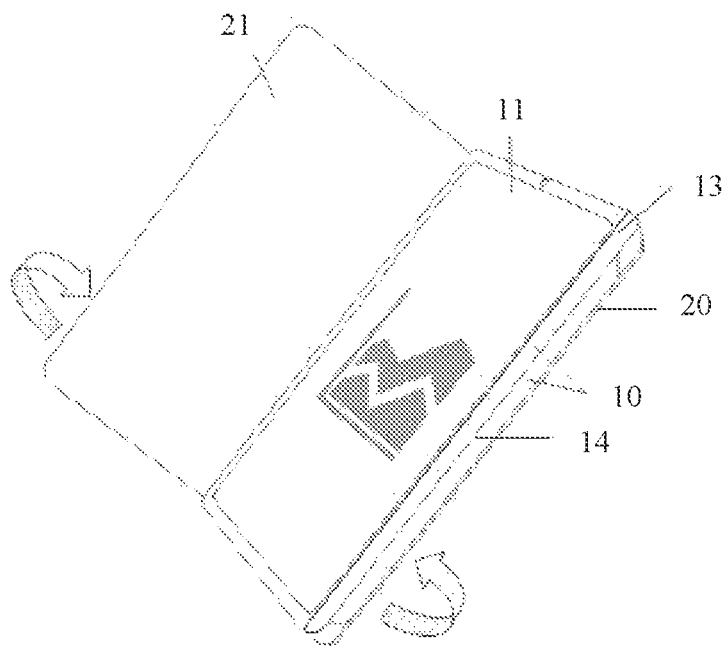
FIG. 9 is a schematic diagram of a state in which a protective cover of an electronic device is to close according to an embodiment of this application.

Referring to FIG. 9, in this case, before the outer screen 11 is switched to the inner screen 12, because the user is browsing content of an application in the foldable mobile phone 100, the user has performed an unlocking operation, and therefore the foldable mobile phone 100 is in a screen unlocked state.

In both Case 1 and Case 2, the user first browses through the outer screen 11, and then switches to the inner screen 12 for further browsing. When switching from the outer screen 11 to the inner screen 12, the user usually performs the following operations on the foldable mobile phone 100:

Further referring to FIG. 8 or FIG. 9, first, the user holds the foldable mobile phone 100 with a right hand, and covers, with a left hand on the surface of the outer screen 11 in a direction indicated by an arrow, the protective cover 21 lifted through rotation about the rotating shaft 19.

Figure 10:
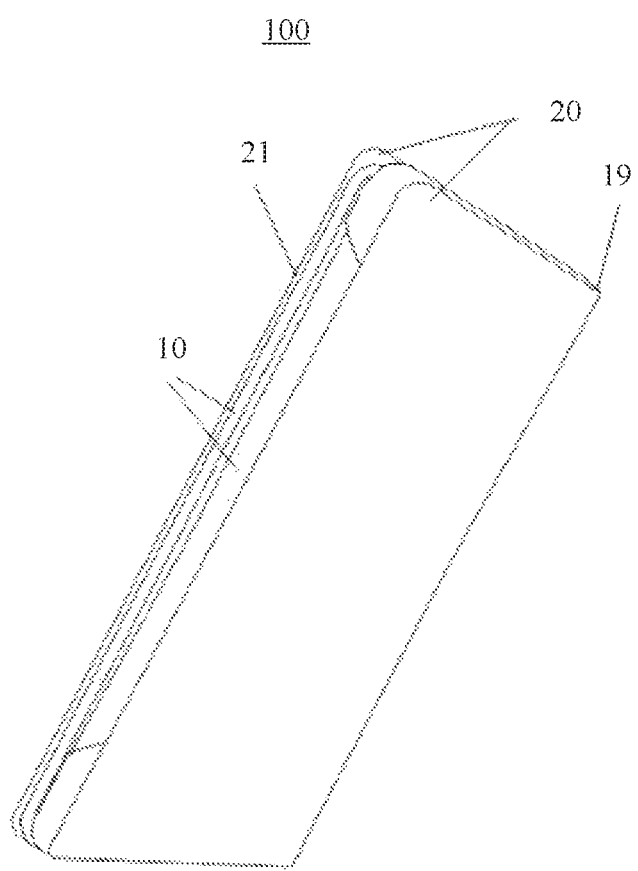
FIG. 10 is a schematic diagram of a state in which an electronic device is to unfold according to an embodiment of this application.

Referring to FIG. 10, when the protective cover 21 covers the outer screen 11, an operation is performed on the foldable body 10 with the right hand to enable the foldable body 10 to rotate about a rotating shaft 19, so that the outer screen 11 also synchronously approaches the protective cover 21. In this process, a thumb of the left hand approaches an end of the first body 13 and an end of the second body 14 that are away from the rotating shaft 19.

Figure 11:
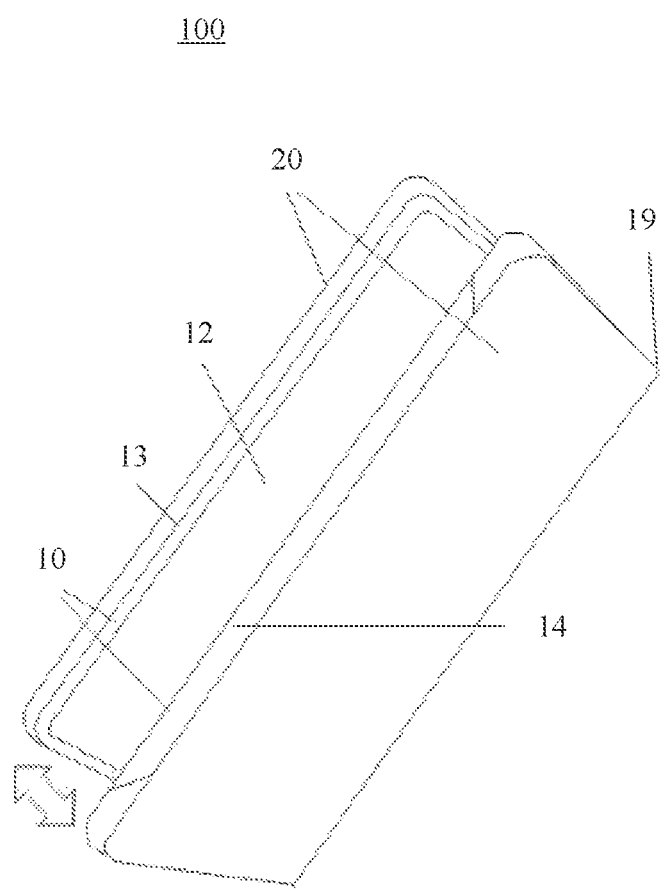
FIG. 11 is a schematic diagram of a state in which an electronic device is being unfolded according to an embodiment of this application.

Referring to FIG. 11, after the thumb of the left hand and a thumb of the right hand of the user respectively touch the end of the first body 13 and the end of the second body 14 that are away from the rotating shaft 19, the thumb of the left hand and the thumb of the right hand of the user cooperate to press end surfaces that are of the first body 13 and the second body 14 and that are away from the rotating shaft 19 and forcibly make the first body 13 and the second body 14 rotate about the rotating shaft 19 in arrow directions and be unfolded.

Figure 12:
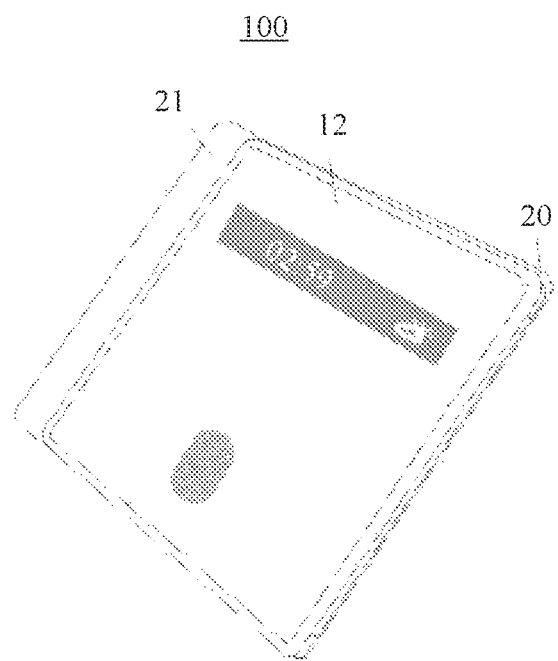
FIG. 12 is a schematic diagram of an electronic device in an unfolded state according to an embodiment of this application.

As shown in FIG. 12, the foldable mobile phone 100 finally stays in the unfolded state, and in this case, the inner screen 12 is unfolded to face the user. In this case, the inner screen 12 may be displayed as a lock screen.

Referring to FIG. 8, for Case 1, after the user opens the outer screen 11 to browse the reminder information, and before the inner screen 12 is unfolded and the foldable mobile phone 100 is unlocked, the foldable mobile phone 100 is usually in the screen locked state. Therefore, after opening the inner screen 12, the user needs to manually perform unlocking before further browsing information. This increases user operation steps, and affects browsing efficiency and browsing experience.

In an embodiment, in an operation process shown in FIG. 8 to FIG. 10 (excluding FIG. 9), when the protective cover 21 approaches and covers the outer screen 11, so that the signal sensing component senses a signal transmitted by the signal transmitter, the signal sensing component may send an interrupt trigger signal to the processor of the foldable mobile phone 100. In this case, the foldable mobile phone 100 is in the screen locked state, and the screen locking function does not need to be re-invoked. Therefore, the foldable mobile phone 100 still remains in the screen locked state.

For Case 2, when the user browses the outer screen 11, the user has performed an unlocking operation, and the foldable mobile phone 100 is in the screen non-locked state. In the steps shown in FIG. 9 and FIG. 10, when the user performs an operation of covering the protective cover 21 on the outer screen 11, the protective cover 21 covers the surface of the outer screen 11, and the processor may invoke the screen locking function based on an interrupt trigger signal. Therefore, even in a case in which the outer screen 11 is in the screen non-locked state, when the mobile phone is switched from the folded state to the unfolded state, the inner screen 12 is in the locked state after being powered on. The user needs to further perform an unlocking operation before browsing, through the inner screen 12, content displayed on the outer screen 11. This affects continuity of continuing to browse the content on the outer screen 11 by the user through the inner screen 12, and reduces browsing efficiency.

Therefore, it can be learned from the foregoing embodiment that, during use of the foldable mobile phone 100, if the user needs to switch to the inner screen 12 for further browsing after the user performs operations of opening the protective cover 21 and then covering the protective cover 21 on the outer screen 11, because the inner screen 12 is usually in the screen locked state, as shown in FIG. 12, when further browsing needs to be performed by using the inner screen 12, an unlocking step usually needs to be performed again. This reduces browsing efficiency of the user.

It may be understood that the foregoing case is merely an example for description, and does not constitute a limitation on a specific use scenario of the foldable mobile phone 100.

It can be learned from the foregoing use scenario of the user that, in the process in which the user covers the outer screen 11 with the protective cover 21 and then unfolds the inner screen 12, the foldable mobile phone 100 has a specific posture, and the user also has a specific action. A specific contact position also exists between the foldable mobile phone 100 and the hand of the user. Therefore, the foldable mobile phone 100 may be configured, so that the foldable mobile phone 100 can sense the specific gesture, the specific position, or the specific contact position, and the foldable mobile phone 100 enters the screen non-locked state when the inner screen 12 is unfolded, to omit the unlocking step of the user and improve browsing efficiency of the user.

In an embodiment, a signal may be sent to the processor when a position or pressing pressure of the hand relative to the first body 13 and the second body 14 changes in a process in which the user performs an operation on the mobile phone to unfold the inner screen 12. The processor controls the foldable mobile phone 100 to enter the screen non-locked state, so that the user omits the unlocking operation when switching from the outer screen 11 to the inner screen 12 for viewing.

In an embodiment, when the user browses the outer screen 11, and the foldable mobile phone 100 is in the screen unlocked state, after the protective cover 21 covers the surface of the outer screen 11, the processor may not invoke the screen locking function within a specific time. The processor may further determine whether a touch signal or a pressure signal of the hand is detected at a specific part of the first body 13 or the second body 14. If a touch signal and a pressure signal are applied to the specific part, the user probably is to open the inner screen 12 next. In this case, the processor may control the foldable mobile phone 100 not to enter the screen locked state, and the inner screen 12 may synchronously display, after being powered on, content displayed on the outer screen 11.

Figure 13:
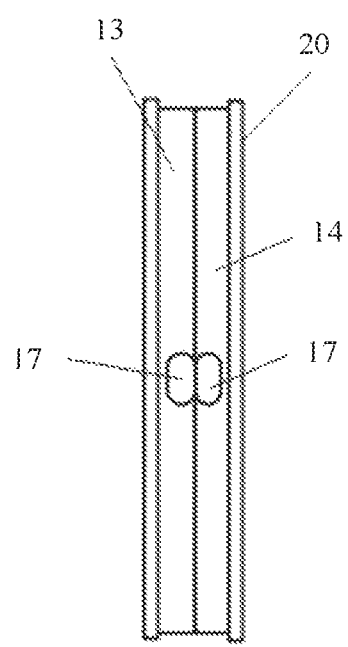
FIG. 13 is a view of an end surface of an electronic device according to an embodiment of this application.

Referring to FIG. 13, in an embodiment, a specific part 17 may be located on an end surface that is of the first body 13 or the second body 14 and that is away from the rotating shaft 19. When the user needs to lift the first body 13 from a surface of the second body 14, the thumb of the left hand and the thumb of the right hand usually press the end surfaces, so that touch and pressure are applied to the end surfaces. When a sensor on the end surface detects a touch signal or a pressure signal, the processor may control the inner screen 12 to be in the screen non-locked state, so that the unlocking step is skipped, thereby improving browsing experience of the user.

Figure 14:
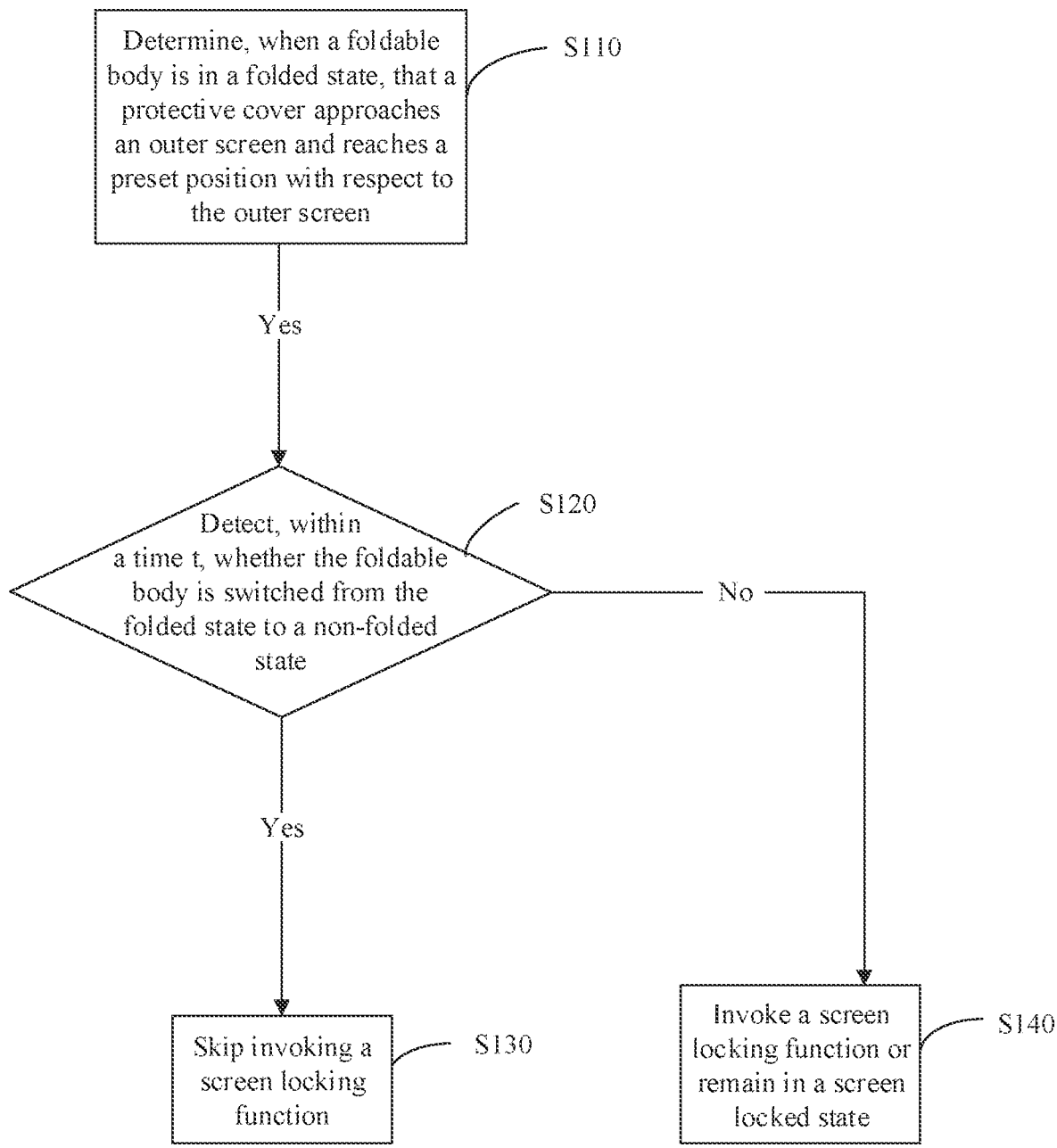
FIG. 14 is a flowchart of an electronic device display method according to an embodiment of this application.

Referring to FIG. 14, an embodiment of this application provides an electronic device display method. The method may include the following steps.

S110: Determine, when a foldable body 10 is in a folded state, that a protective cover 21 approaches an outer screen 11 and reaches a preset position with respect to the outer screen 11.

When a user covers the outer screen 11 with the protective cover 21, a Hall effect sensor detects a magnetic field generated by a magnet disposed on the protective cover 21, and then sends an interrupt trigger signal to a processor. The preset position may be a position of the protective cover 21 relative to the outer screen when the Hall effect sensor can detect that a magnetic flux generated by the magnet reaches a magnetic flux threshold. In an embodiment, the preset position may be a position at which an included angle between the protective cover 21 and the outer screen 11 is 0°. It may be understood that the Hall effect sensor herein is merely used as an example for description, and does not limit a type of a component that can sense a relative position relationship between the protective cover 21 and the outer screen 11.

A scenario in which the user covers the protective cover 21 on the outer screen may be Case 1 or Case 2 in the foregoing embodiment. It may be understood that a use scenario of the user is not limited thereto, and the user may alternatively performs an operation of covering the protective cover 21 on the outer screen 11 in another case. For example, when the user browses a webpage, a novel, or the like through the outer screen 11, the foldable mobile phone 100 enters a screen locked state by default after having sensed no operation of the user for a period of time. In this case, the user needs to perform an unlocking operation before further browsing. In this case, the user may choose to directly open an inner screen 12 to browse. In a process of opening the inner screen 12, the protective cover 21 also covers a surface of the outer screen 11.

S120: Detect, within a time t, whether the foldable body 10 is switched from the folded state to a non-folded state.

In the use scenario of the foregoing embodiment, after it is determined that the user covers the outer screen 11 with the protective cover 21, it indicates that the user may perform two operations next: The first operation is to keep the protective cover 21 covering the surface of the outer screen 11, and the user temporarily is not to browse the mobile phone. The second operation is that the user unfolds the inner screen 12 while covering the surface of the outer screen 12 with the protective cover 21. If the user selects the first operation, the foldable mobile phone 100 may invoke a screen locking function, and then enter the screen locked state.

If the user selects the second operation, the foldable mobile phone 100 directly invokes the screen locking function, and to further browse through the inner screen 12, the user needs to further perform an unlocking step. This affects browsing continuity experience of the user. Therefore, the time t may be reserved to delay invoking the screen locking function, an operation of the user may be detected within the time t, and it is determined, based on the operation of the user, whether to invoke the screen locking function.

In an embodiment, the non-folded state may include an unfolded state and a bracket state. The processor may determine, by detecting an included angle between a first body 13 and a second body 14, whether the foldable body 10 is switched to the non-folded state. When the included angle between the first body 13 and the second body 14 is greater than a preset angle, it may be considered that the foldable mobile phone 100 is in the unfolded state. In this case, it may be determined that the user switches from the outer screen 11 to the inner screen 12 to continue browsing. For the preset angle, refer to the descriptions in the foregoing embodiment. Details are not described herein again.

The time t may be adjusted based on a use habit of the user. In an embodiment, the time t may be 2 seconds. To be specific, if the user wants, after lifting the protective cover 21 to browse content displayed on the outer screen 11, to further browse the content displayed on the outer screen 11 from the inner screen 12, a time from covering the protective cover 21 on the surface of the outer screen 11 to separating the first body 13 and the second body 14 to unfold the inner screen 12 usually falls within 2 seconds.

When the foldable body 10 is switched from the folded state to the non-folded state within the time t, it indicates that the user needs to unfold the inner screen 12 to browse. Therefore, S130 may be performed.

It may be understood that "within the time t" may be understood as being within a preset time after the protective cover 21 reaches the preset position. The preset time after the protective cover 21 reaches the preset position may be used only as one preset condition for determining whether the foldable body 10 is switched to the non-folded state. In other words, there may be a plurality of preset conditions before it is determined whether the foldable body 10 is switched to the non-folded state. It may be understood that the plurality of preset conditions may be concurrently executed, or may have a sequential logical relationship.

S130: Skip invoking the screen locking function.

It may be understood that if the foldable body 10 is switched from the folded state to the non-folded state within the time t, in other words, when duration in which the foldable body 10 is switched from the folded state to the non-folded state is less than the time t, it may be determined not to invoke the screen locking function. In this case, the foldable mobile phone 100 is in a screen non-locked state. The inner screen 12 also displays a non-lock screen.

When it is determined that the foldable body 10 is switched to the non-folded state, the user probably needs to browse through the inner screen 12. Therefore, the inner screen 12 may directly enter the screen non-locked state. When the user further opens the inner screen 12, the user does not need to further perform unlocking, so that browsing efficiency and browsing experience of the user are improved.

In an embodiment, when the outer screen 11 displays a non-lock screen before the user covers the outer screen 11 with the protective cover 21, the inner screen 12 continues to display the non-lock screen after the user opens the inner screen 12. Therefore, browsing continuity experience of the user can be improved.

However, when the foldable body 10 always remains in the folded state within the time t, it may be determined that the user temporarily is not to browse the foldable mobile phone again, and therefore S140 may be performed.

S140: Invoke the screen locking function or remain in the screen locked state.

When the user does not open the inner screen 12 within the time t, if the foldable mobile phone 100 is in the screen locked state when being in the folded state, the foldable mobile phone 100 continues to remain in the screen locked state. If the user does not open the inner screen 12 within the time t, and the foldable mobile phone 100 is in the unlocked state when being in the folded state, the screen locking function is invoked after the time t to perform screen locking, to avoid a misoperation and save power.

Figure 15:
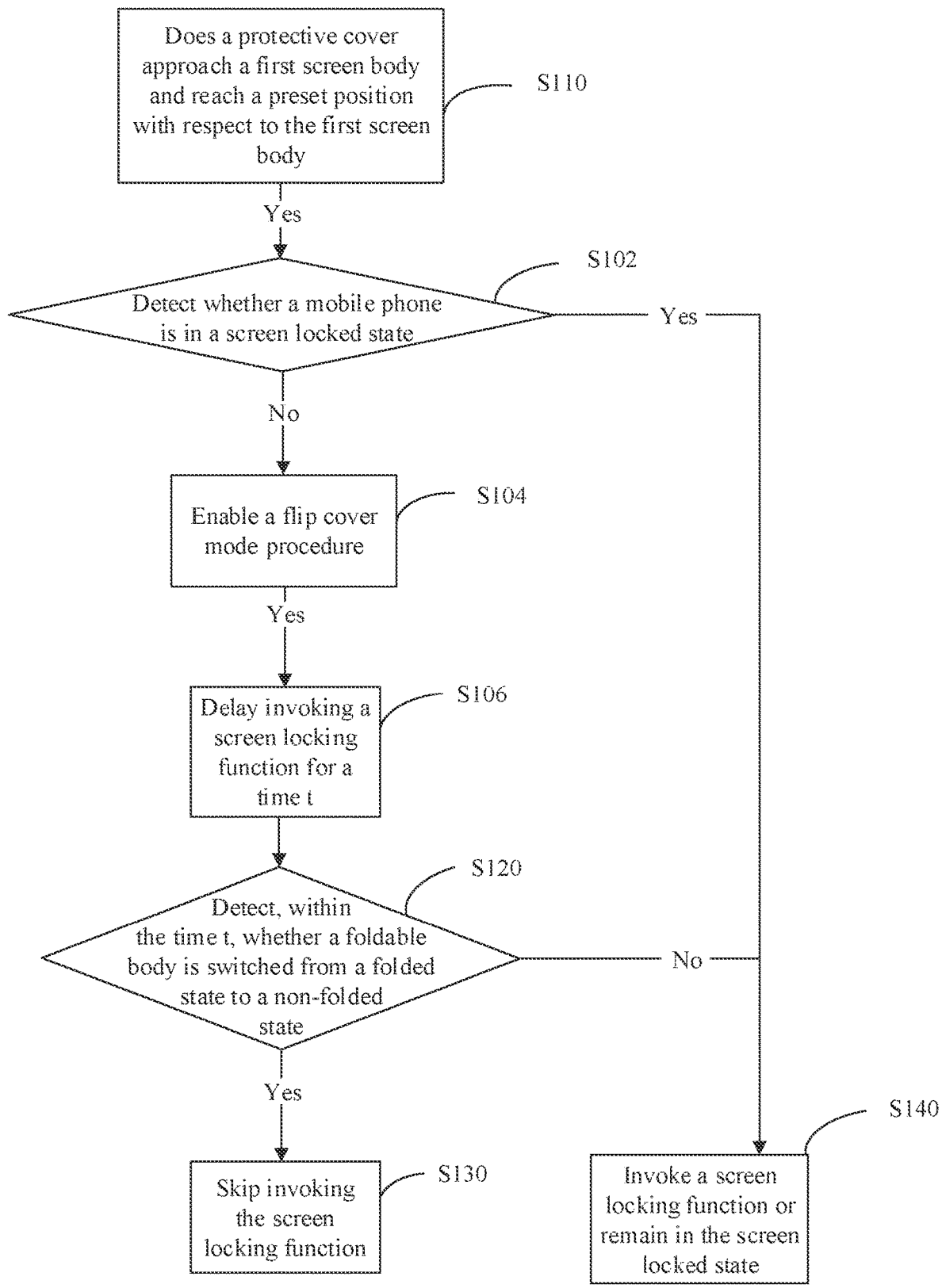
FIG. 15 is a flowchart of an electronic device display method according to an embodiment of this application.

Referring to FIG. 15, in an embodiment, after the determining, when a foldable body 10 is in a folded state, that a protective cover 21 approaches an outer screen 11 and reaches a preset position with respect to the outer screen 11 in S110, the electronic device display method further includes the following steps.

S102: Detect whether the foldable mobile phone is in the screen locked state.

When the protective cover 21 covers the outer screen 11, after receiving an interrupt trigger signal, the processor detects whether the foldable mobile phone 100 is in the screen locked state. S140 is performed if the foldable mobile phone 100 is in the screen locked state; or S104 and S106 are performed if the foldable mobile phone 100 is in the screen non-locked state.

In some scenarios, after opening the protective cover 21, the user may only view information such as time and a date through the outer screen 11, but does not perform an unlocking operation, and then the user directly covers the surface of the outer screen 11 with the protective cover 21. In this use scenario, the foldable mobile phone 100 is always in the screen locked state. Alternatively, in some other scenarios, after browsing the outer screen 11, the user does not need to perform a further operation by using the inner screen 12, but directly locks a screen of the foldable mobile phone 100 through a manual operation. In these scenarios, an operation of opening the inner screen 12 is not performed within the time t. Therefore, it can be determined that the user has no intention to unfold the inner screen 12, and the foldable mobile phone 100 can be controlled to be in the screen locked state, in other words, the foldable mobile phone 100 can remain in the screen locked state.

It may be understood that, that the foldable mobile phone is in the screen non-locked state may be used as a preset condition for determining whether the foldable body 10 is switched to the non-folded state.

In an embodiment, the processor may determine, depending on whether the outer screen 11 is powered off, whether the foldable mobile phone 100 is in the screen locked state. In this process, the foldable mobile phone 100 may not enter a flip cover mode immediately.

S104: Enable a flip cover mode procedure.

When the foldable mobile phone 100 is in the screen non-locked state, and the protective cover 21 directly covers the surface of the outer screen 11, the processor determines that the foldable mobile phone 100 is in the screen non-locked state, and the foldable mobile phone 100 may enable the flip cover mode procedure after receiving an interrupt trigger signal. Enabling the flip cover mode procedure may include a process of detecting whether the foldable mobile phone 100 is in the flip cover mode.

If it is detected, in S102, that the foldable mobile phone 100 is in the screen non-locked state, S104 may alternatively be skipped to perform S106. In other words, execution of S106 may not be invoked by S104.

S106: Delay invoking the screen locking function for the time t.

When the foldable mobile phone 100 is in the screen non-locked state, it indicates that the user browses the outer screen 11 when the foldable mobile phone is in the screen non-locked state. Based on a use habit of the user, if the protective cover 21 covers the surface of the outer screen 11 in this case, it indicates that the user may perform an operation of unfolding the inner screen 12 next, and further browse, through the inner screen 12, content displayed on the outer screen 11. If the foldable mobile phone 100 is enabled to enter the screen locked state in this case, a lock screen is displayed when the user opens the inner screen 12. This certainly affects browsing experience of the user. Therefore, the processor may invoke a function of delaying screen locking, and determine, based on a next action of the user, whether to lock the screen of the foldable mobile phone 100. In an embodiment, invocation of the screen locking function may be delayed by delaying invoking a screen locking application.

It may be understood that, alternatively, S104 and S106 may be synchronously performed. S106 may alternatively be performed before or after S104. S104 may not be used as a previous step of S106, and the foldable mobile phone 100 may run the flip cover mode after the time t.

Figure 16:
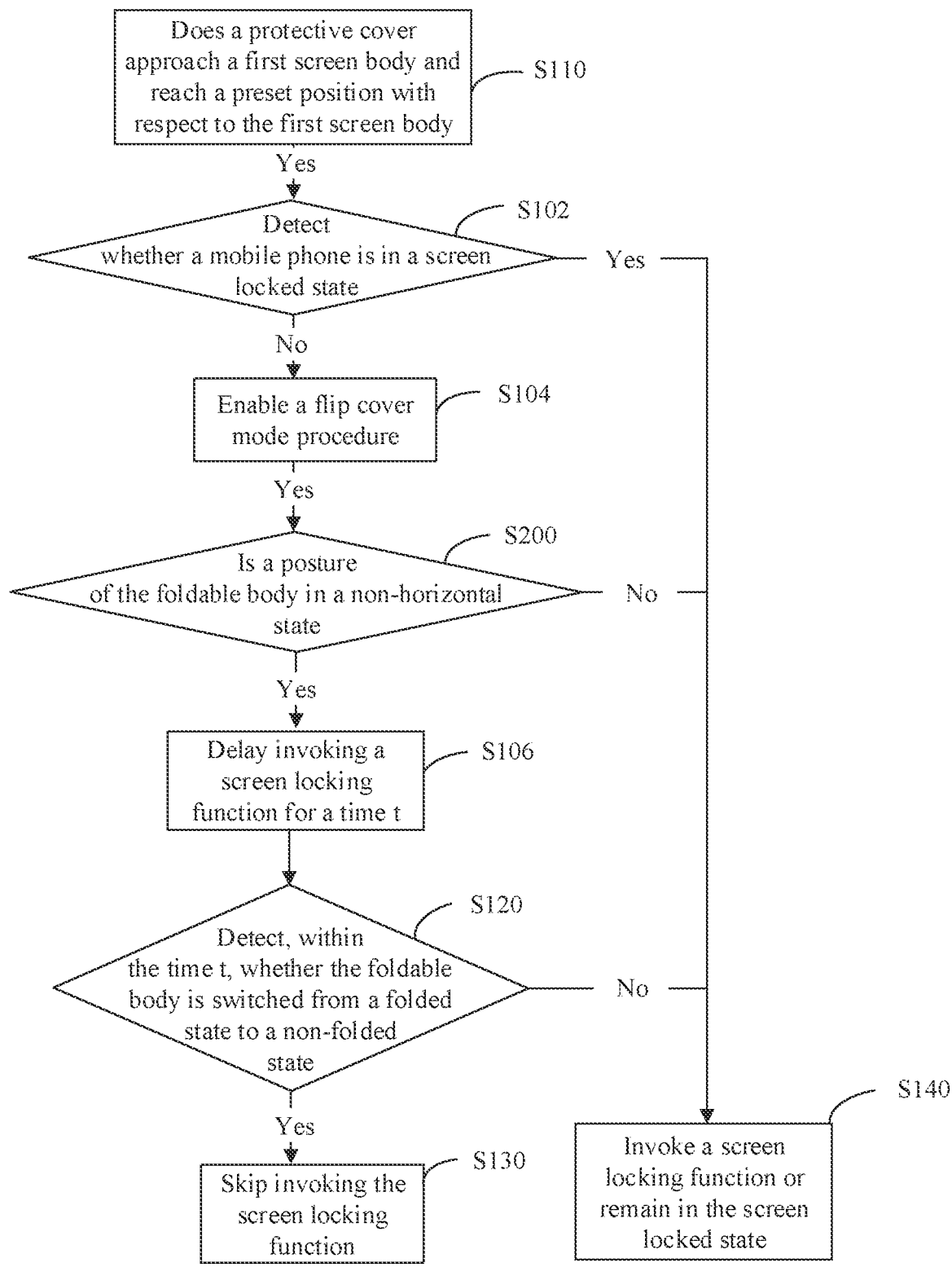
FIG. 16 is a flowchart of an electronic device display method according to an embodiment of this application.

Referring to FIG. 16, in an embodiment, before the delaying invoking the screen locking function of the foldable mobile phone 100 in S106, the method may further include the following step:

S200: Detect whether a posture of the foldable body 10 is in a non-horizontal state.

It may be understood that if a plane on which the outer screen 11 is located is parallel to a horizontal plane when the foldable body 10 is in the folded state, it indicates that the user horizontally places the foldable mobile phone 100. Generally, when the user normally views the foldable mobile phone 100, the foldable mobile phone 100 is tilted with respect to the horizontal plane in most cases. If the foldable mobile phone 100 is horizontally placed, it indicates that the user probably is not viewing the foldable mobile phone 100. Therefore, if the processor determines that the foldable mobile phone 100 is in a horizontal state, S140 may be directly performed to invoke the screen locking function. It may be understood that whenever an included angle of the plane on which the outer screen 11 is located relative to the horizontal plane falls within a threshold range, it may be considered that the foldable mobile phone 100 is in the horizontal state. The threshold may be an acute angle between the plane on which the outer screen 11 is located and the horizontal plane. In an embodiment, the threshold is less than or equal to 40°. The threshold may be 30°, 25°, 20°, or the like.

In some embodiments, it may be determined, by using an element of a gyro sensor, an acceleration sensor, or the like, whether the posture of the foldable body 10 is in the non-horizontal state.

It should be noted that S200 and S104 may be concurrently performed, and may be performed independently of each other. A sequence relationship between S200 and S104 is not limited herein.

If the processor determines, when the foldable body 10 is in the folded state, that the posture of the foldable body 10 is in the non-horizontal state, it indicates that the foldable mobile phone 100 is tilted. In this case, the user probably is to open the inner screen 12 to continue browsing. Therefore, S106 may be performed to further obtain a behavior of the user within the time t and determine whether the user is to open the inner screen 12 for browsing.

It may be understood that, that the posture of the foldable body 10 is in the non-horizontal state may be used as a preset condition for determining whether the foldable body 10 is switched to the non-folded state.

Figure 17A:
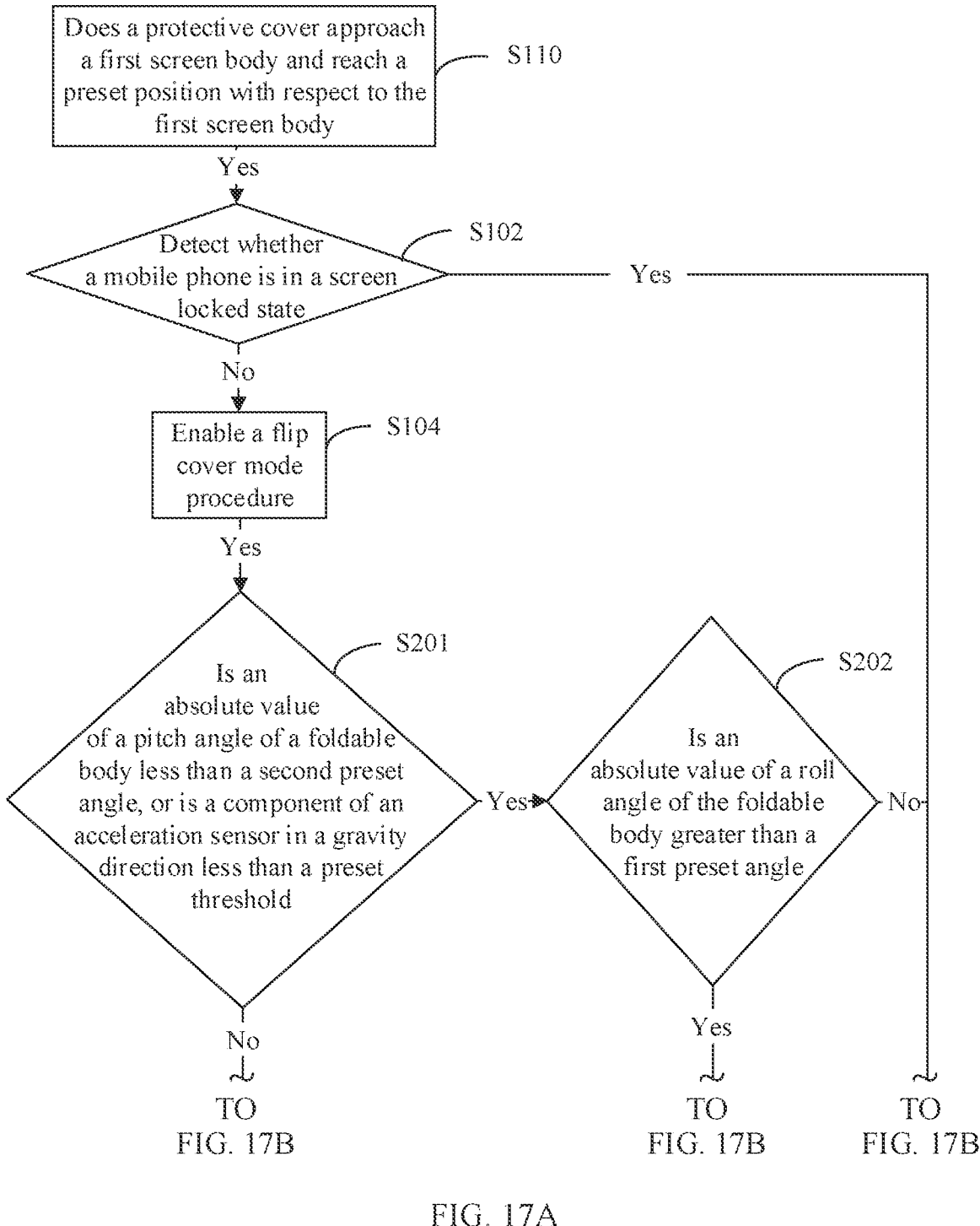
FIG. 17A and FIG. 17B are a flowchart of an electronic device display method according to an embodiment of this application.
Figure 17B:
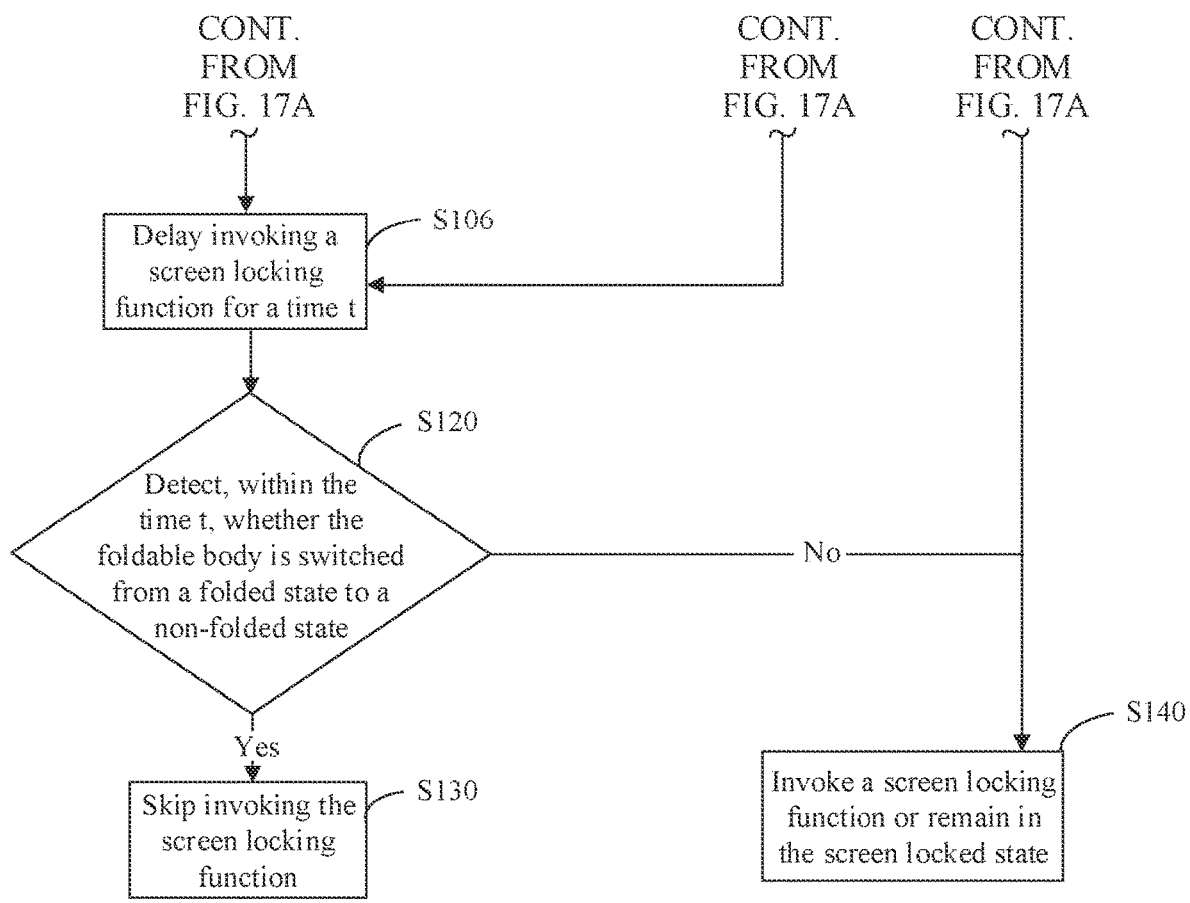

Referring to FIG. 17A and FIG. 17B, in an embodiment, S200 may include the following step:

S202: Determine whether an absolute value of a roll angle of the foldable body 10 is greater than a first preset angle, where a rotation axis corresponding to the roll angle is parallel to a folding axis of the foldable body.

Figure 18:
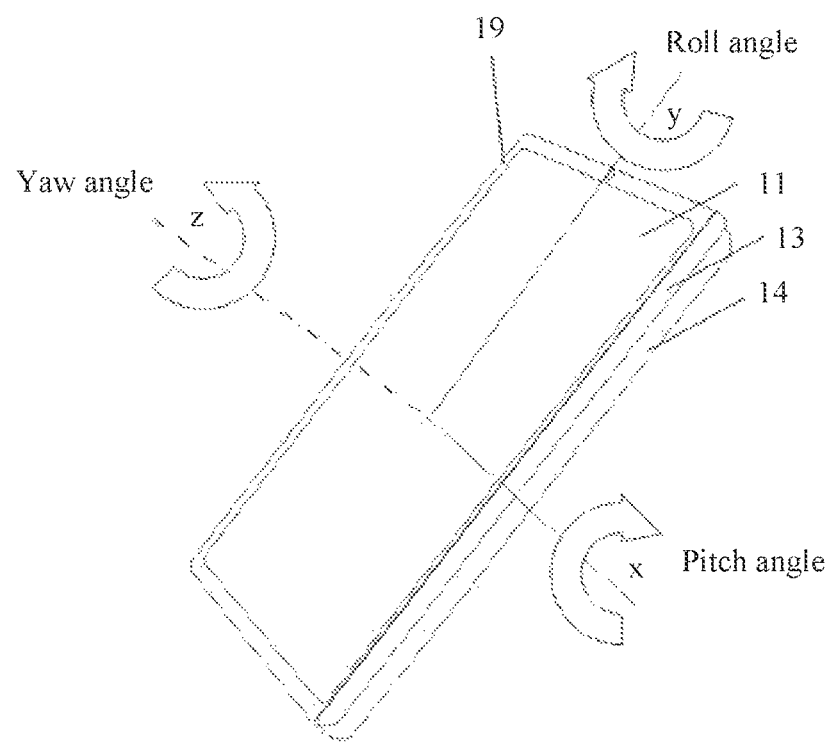
FIG. 18 is a schematic diagram of a position relationship between a coordinate system and an electronic device according to an embodiment of this application.

Referring to FIG. 18, posture angles (Euler angles) may be used herein to represent the posture of the foldable body 10. The posture angles are determined by a relationship between a coordinate system of the foldable body 10 and a geographical coordinate system. When the foldable body 10 is in the folded state, a Cartesian coordinate system (X, Y, Z) is defined by using a center of the plane on which the outer screen 11 is located as a circle center. The Euler angles are angles by which the foldable mobile phone 100 rotates about three axes of the coordinate system (X, Y, Z). The folding axis of the foldable body may be a rotation axis of a rotating shaft 19 connecting the first body 13 and the second body 14. A Y axis is parallel to the rotation axis.

An angle by which the foldable body 10 rotates about an X axis is a pitch (Pitch) angle, an angle by which the foldable body 10 rotates about the Y axis is a roll (Roll) angle, and an angle by which the foldable body 10 rotates about a z axis is a yaw (Yaw) angle. The Euler angles include the pitch angle, the roll angle, and the yaw angle. The Euler angles may be calculated from acceleration components of the acceleration sensor in the foldable body 10 on the X axis, the Y axis, and the Z axis.

If the user needs to further browse the inner screen 12 after browsing the outer screen 11, the user usually performs the following operations:

The user covers the surface of the outer screen 11 with the protective cover 21 by a left hand, and raises, by a right hand, ends that are of the first body 13 and the second body 14 and that are away from the rotating shaft 19, so that the foldable body 10 rotates about the rotating shaft 19 from a right side to a left side shown in the figure, and therefore a thumb of the left hand presses end surfaces that are of the first body 13 and the second body 14 and that are away from the rotating shaft 19. In this process, the pitch angle of the foldable body 10 changes little. The foldable mobile phone 100 rotates about the Y axis, in order words, the roll angle of the foldable body 10 changes.

If the absolute value of the roll angle of the foldable body 10 is greater than the first preset angle, it indicates that the user is probably preparing to unfold the inner screen 12. Therefore, it may be considered that the user is to open the inner screen 12 next to continue browsing. To improve continuity between browsing the inner screen 12 and browsing the outer screen 1 by the user, in this case, S106 may be performed to delay invoking the screen locking function for the time t.

If the absolute value of the roll angle of the foldable body 10 is not greater than the first preset angle, it indicates that the foldable terminal 10 rotates about the folding axis by a relatively small angle or does not rotate. Therefore, it may be determined that the user probably is not to continue to browse the inner screen 12. Therefore, S104 may be performed to invoke the screen locking function. In some embodiments, the first preset angle may be 60°, 70°, or 80°.

Further, in an embodiment, before S202, the method may further include the following step:

S201: Determine whether an absolute value of the pitch angle of the foldable body 10 is less than a second preset angle, or whether a component value of the acceleration sensor in the foldable body 10 in a gravity direction is less than a preset threshold, where a rotation axis corresponding to the pitch angle is perpendicular to the rotation axis corresponding to the roll angle.

In this embodiment, the component of the acceleration sensor in the foldable body 10 in the gravity direction may be calculated by using the pitch angle of the foldable body 10. Therefore, the posture of the foldable body 10 can be determined by using only one of two physical quantities: the pitch angle of the foldable body 10 and the component of the acceleration sensor in the foldable body 10 in the gravity direction.

If the foldable body 10 is vertically placed (the plane on which the outer screen 11 is located is perpendicular to the horizontal plane), acceleration values on the X axis, the Y axis, and the Z axis are respectively x=0, y=9.8, and z=0. Therefore, the pitch angle of the foldable body 10 is 90 degrees. When the foldable body 10 is horizontally placed, y=0, and the pitch angle is 0 degrees. In a process in which the foldable body 10 is converted from being horizontally placed to being vertically placed, an acceleration value of the acceleration sensor on they axis increases from 0 to 9.8, and the pitch angle of the foldable body 10 increases from 0 degrees to 90 degrees or minus 90 degrees (when the user lies down and views the mobile phone, the outer screen 11 faces downward, and the pitch angle is negative in this case).

If the absolute value of the pitch angle is not less than the second preset angle, it indicates that in this case, the posture of the foldable terminal is nearly perpendicular to the horizontal plane, a two-dimensional projection amount, on the horizontal plane, of an X axis and a Z axis of a gravitational acceleration is relatively small. A relatively small fluctuation leads to a relatively large error in calculating the roll angle. If the absolute value of the pitch angle of the foldable body 10 is not less than the second preset angle, or the component of the acceleration sensor in the foldable body 10 in the gravity direction is not less than the preset threshold, the calculated roll angle cannot accurately reflect the posture of the foldable terminal. In this case, to prevent user experience from being affected because the foldable mobile phone 100 enters the screen locked state due to incorrect determining, S106 may be directly performed to delay invoking the screen locking function for the time t.

If the absolute value of the pitch angle of the foldable body 10 is less than the second preset angle, or the component of the acceleration sensor in the foldable body 10 in the gravity direction is less than the preset threshold, it indicates that the roll angle obtained in this case can relatively accurately reflect the posture of the foldable body 10. Therefore, S202 may be performed to determine an intention of the user from the posture of the foldable body 10, to determine whether to delay invoking the screen locking function for the time t.

In an embodiment, the second preset angle may be 60 degrees or a value close to 60 degrees, for example, 58 degrees, 59 degrees, 70 degrees, 72 degrees, or 75 degrees. For the component of the acceleration sensor in the gravity direction, the preset threshold may be 7 or a value close to 7, for example, a value less than 7 or a value greater than 7.

Figure 19A:
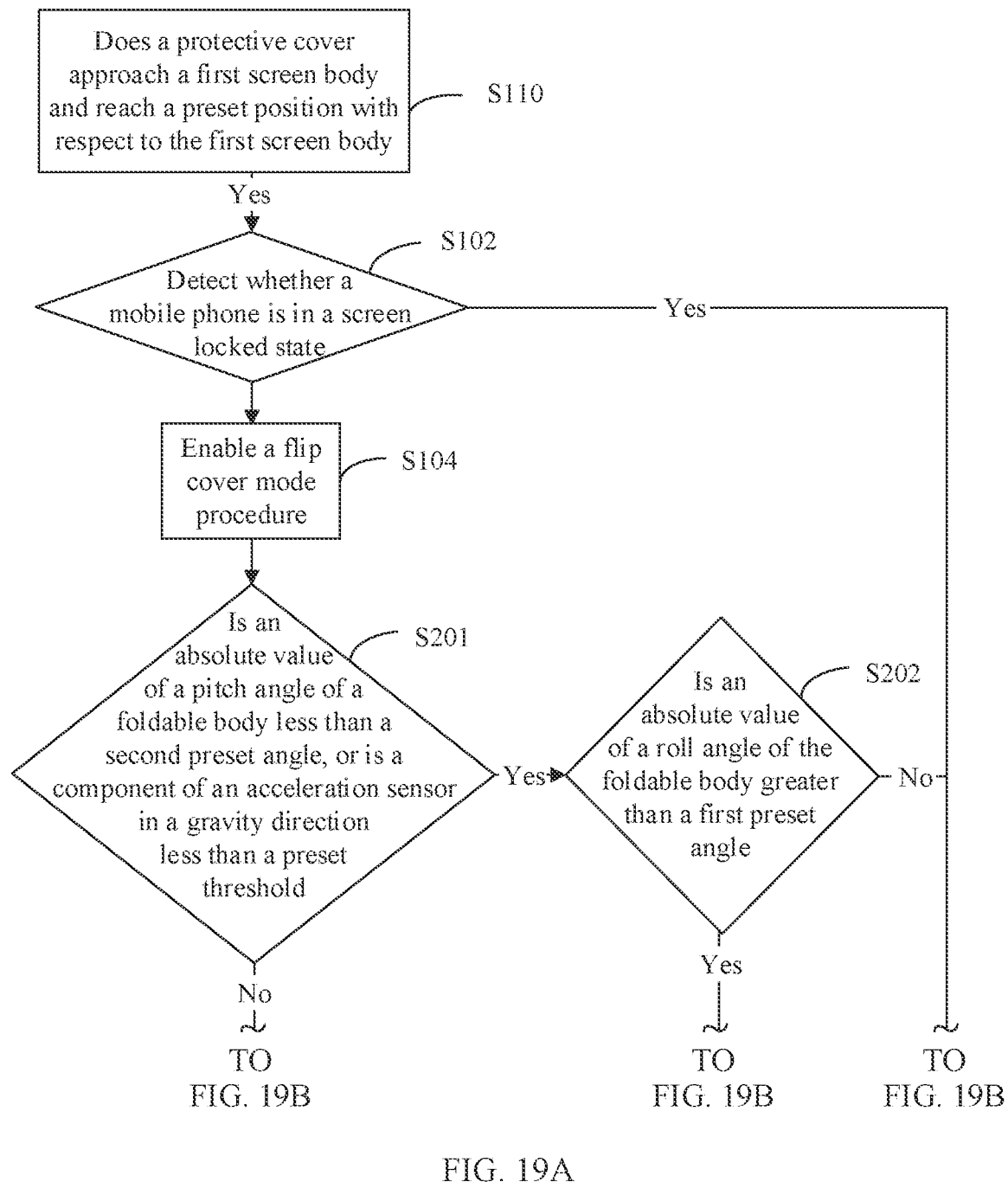
FIG. 19A and FIG. 19B are a flowchart of an electronic device display method according to an embodiment of this application.
Figure 19B:
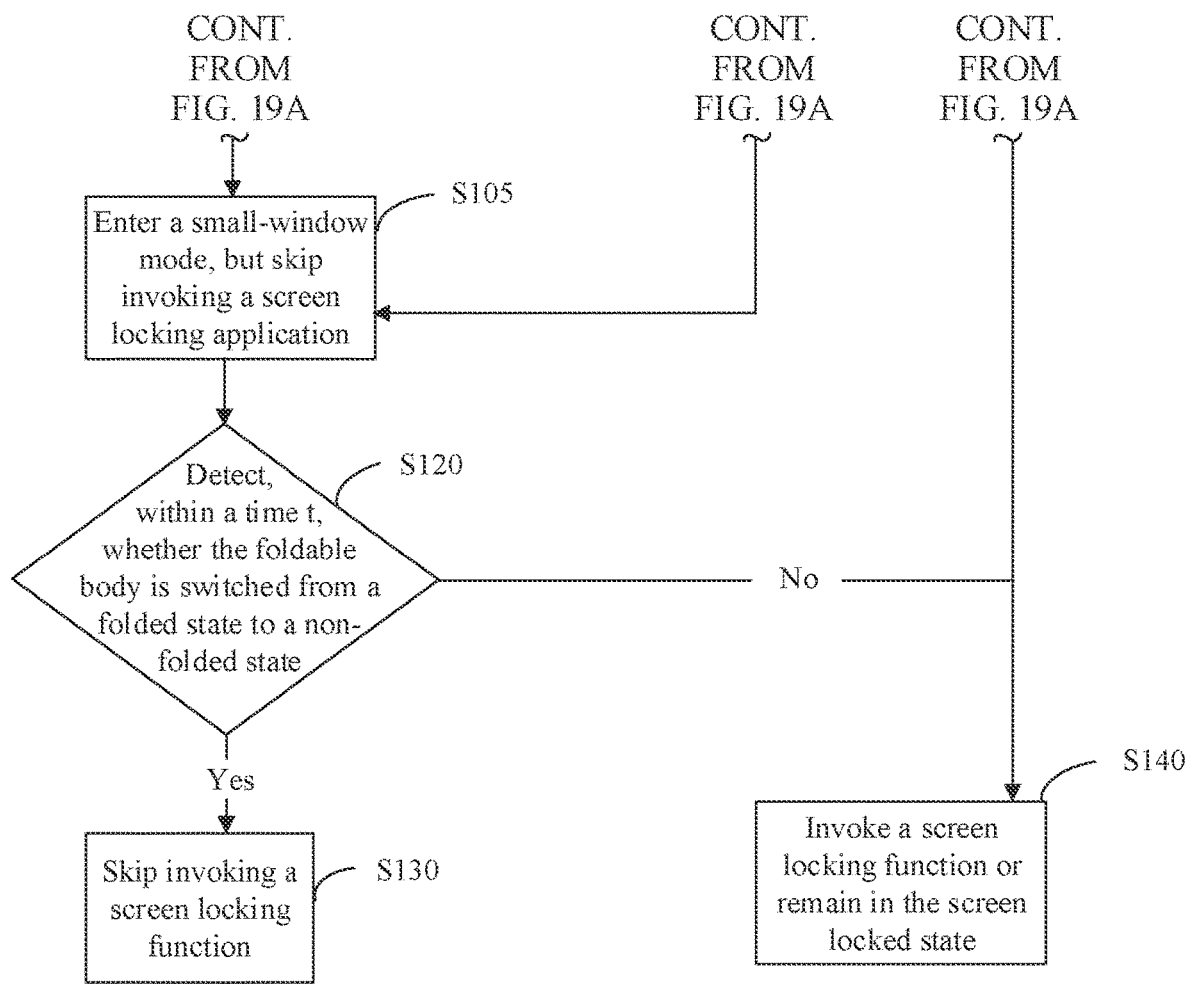

Referring to FIG. 19A and FIG. 19B, in an embodiment, if it is determined, in S201, that the absolute value of the pitch angle of the foldable body 10 is not less than the second preset angle, or the component value of the acceleration sensor in the foldable body 10 in the gravity direction is not less than the preset threshold, the following step is performed:

S105: Control the foldable mobile phone 100 to enter a small-window mode, but skip invoking the screen unlocking function.

In this embodiment, when it is determined that the absolute value of the pitch angle is not less than the second preset angle, or the component value of the acceleration sensor in the gravity direction is not less than the preset threshold, it indicates that in this case, the posture of the foldable body 10 cannot be accurately determined, in other words, a next intention of the user cannot be accurately determined. In this case, the user may not further unfold the inner screen 12 to continue browsing. Therefore, the small-window mode in the flip cover mode may be enabled. If the user indeed does not open the inner screen 12 to continue browsing, the user may further quickly browse information such as time and a short messaging service message through a small window of the outer screen 11, so that browsing continuity experience of the user is improved. However, if the foldable mobile phone 100 completely enters the flip cover mode, in other words, the foldable mobile phone 100 enters the screen locked state while entering the small-window mode, the user needs to perform an unlocking operation if the user needs to unfold the inner screen 12 next for browsing. This affects browsing continuity of the user. Therefore, in this case, the screen locking function is not invoked when the small-window mode is enabled, and step S120 is performed to determine whether the user switches the foldable body 10 from the folded state to the non-folded state.

In this embodiment, if it is determined that the foldable body 10 is switched from the folded state to the non-folded state, it indicates that the user switches from the outer screen 11 to the inner screen 12 to continue browsing, and in this case, the screen locking function does not need to be re-invoked. Therefore, the foldable mobile phone 100 may be controlled to exit the small-window mode. In this case, the outer screen 11 may be powered off and be in a screen-off state, to save power.

If it is determined, in S202, whether the absolute value of the roll angle of the foldable body 10 is greater than the first preset angle, S105 may also be directly performed to prevent browsing experience of the user from being affected due to incorrect determining.

An embodiment of this application further provides an electronic device display method. An electronic device includes a foldable body 10, an outer screen 11, and an inner screen 12. The outer screen 11 and the inner screen 12 are respectively located on two opposite surfaces of the foldable body. When the foldable body is in a folded state, and the outer screen 11 displays a non-lock screen, the method includes:

determining that a protective cover 21 approaches the outer screen 11 and reaches a preset position with respect to the outer screen;

when a preset condition is met, determining that the foldable body is switched to a non-folded state; and controlling the inner screen 12 to continue to display the non-lock screen.

When the outer screen 11 displays the non-lock screen, it indicates that a user is browsing content through the outer screen 11. In this case, if it is sensed that the protective cover 21 approaches the outer screen 11 and reaches the preset position with respect to the outer screen 11, it indicates that the user covers a surface of the outer screen 11 with the protective cover 21. If it is determined that the foldable body is switched to the non-folded state within a preset time, it indicates that the user opens the inner screen 12 to continue browsing, and in this case, the inner screen 12 may be controlled to synchronously display the non-lock screen. Therefore, the user may directly browse, through the inner screen 12, the interface just displayed on the outer screen 11, so that browsing continuity of the user is improved.

The preset condition may include at least the preset time, and the preset time may be a period of time after the protective cover 21 approaches the outer screen 11 and reaches the preset position with respect to the outer screen.

It may be understood that, that the inner screen continues to display the non-lock screen may mean that after the inner screen is opened, progress of content displayed on the inner screen is slightly ahead of progress of content displayed when the outer screen is closed, to help the user memorize the content before the outer screen is closed, thereby improving browsing experience. In some embodiments, after the inner screen is opened, progress of content displayed on the inner screen may alternatively be exactly consistent with progress of content displayed before the outer screen is closed.

In an embodiment, the non-lock screen displayed on the outer screen may include a picture, a webpage, and the like. When switching to the inner screen is performed, the inner screen may display the same picture and the same webpage. When the non-lock screen displayed on the outer screen is a video, and switching to the inner screen is performed, play may be continued from the video displayed on the outer screen.

It should be noted that the foldable mobile phone 100 is merely an embodiment provided to explain and describe the method provided in this application. Another electronic device that has a same or similar function may also be applied to the foregoing embodiments.

An embodiment of this application further provides an electronic device. The electronic device may include a foldable body 10, an inner screen 12, an outer screen 11, and a processor 310. The inner screen 12 and the outer screen 11 are respectively located on two opposite surfaces of the foldable body 10. When the foldable body 10 is in a folded state, the outer screen 11 may be located on a surface of the foldable body 10. The foldable body 10 may include a protective cover 21 configured to cover the outer screen 11. The processor is configured to: determine, when the foldable body 10 is in the folded state, that the protective cover 21 approaches the outer screen 11 and reaches a preset position with respect to the outer screen 11, and then control the inner screen 12 to be in a screen non-locked state after determining, within a preset time, that the foldable body 10 is in a non-folded state.

In some embodiments, the electronic device may further include an acceleration sensor and a Hall effect sensor. The Hall effect sensor 381, the inner screen 12, the outer screen 11, and the acceleration sensor 382 are separately connected to the processor. The Hall effect sensor 381 may be configured to detect whether the protective cover 21 approaches the outer screen 11 and reaches the preset position with respect to the outer screen 11. The acceleration sensor 382 may be configured to sense acceleration components of the foldable body 10 in different directions. A posture of the foldable body 10 can be calculated based on the acceleration components. The processor may pre-determine a behavior of a user based on data sent by the acceleration sensor 382 and the Hall effect sensor 381, then control display statuses of the inner screen 12 and the outer screen 11, and control the foldable mobile phone 100 whether to enter a screen locked state.

An embodiment of this application further provides an electronic device. The electronic device includes a foldable body 10, an inner screen 12, an outer screen 11, and a processor. The inner screen 12 and the outer screen 11 are respectively located on two opposite surfaces of the foldable body. The processor is configured to store a memory of executable instructions of the processor. When the processor is configured to execute the instructions, the electronic device is enabled to implement the method in the foregoing embodiments.

An embodiment of this application further provides a chip system. The chip system is configured to execute a computer program stored in a memory, to perform the touchscreen display method in any one of the foregoing embodiments.

An embodiment of this application further provides a computer-readable storage medium. The computer-readable storage medium stores a computer program, and when the computer program runs on a computer, the computer is enabled to perform the method provided in embodiments of this application.

An embodiment of this application further provides a computer program product. The computer program product includes a computer program, and when the computer program product runs on a computer, the computer is enabled to perform the method in the foregoing embodiments.

In addition, units corresponding to the method steps in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product, for example, a program. The software product is stored in a program product, for example, a computer-readable storage medium, including several instructions used to enable a device (which may be a single-chip microcomputer, a chip, or the like) or a processor to perform all or some of the steps of the methods in embodiments of this application. The foregoing storage medium includes any medium that can store program code, for example, a USB flash drive, a removable hard disk, a ROM, a RAM, a magnetic disk, or an optical disc.

For example, an embodiment of this application may further provide a computer-readable storage medium. The computer-readable storage medium stores computer program instructions. When the computer program instructions are executed by an electronic device, the electronic device is enabled to implement the data transmission method in the foregoing method embodiments.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

What is claimed is:

1. An electronic device display method, wherein an electronic device comprises a foldable body, an outer screen, and an inner screen, wherein the outer screen and the inner screen are respectively located on two opposite surfaces of the foldable body, and the method comprises:
    based on the foldable body being in a folded state, detecting whether a protective cover approaches the outer screen and reaches a preset position with respect to the outer screen, wherein a signal transmitting component is disposed on the protective cover, and a signal sensing component is disposed on the outer screen;
    based on determining that the protective cover reaches the preset position with respect to the outer screen, and based on a preset condition being met, determining whether the foldable body is switched to a non-folded state, wherein determining that the protective cover reaches the preset position with respect to the outer screen is based on the signal sensing component sensing a signal transmitted by the signal transmitting component when the protective cover approaches the outer screen; and based on the foldable body being switched to the non-folded state, controlling the electronic device to be in a screen non-locked state;

wherein the preset condition comprises being within a preset time after the protective cover reaches the preset position.

2. The electronic device display method according to claim 1, wherein based on the foldable body not switching to the non-folded state within the preset time after the protective cover reaches the preset position, the electronic device is controlled to be in a screen locked state.

3. The electronic device display method according to claim 1, wherein the preset condition further comprises the electronic device being in the screen non-locked state.

4. The electronic device display method according to claim 3, wherein based on the electronic device being in a screen locked state, the electronic device is controlled to remain in the screen locked state.

5. The electronic device display method according to claim 3,
wherein based on the electronic device being in the screen non-locked state, the outer screen displays a non-lock screen; and
based on determining that the foldable body is switched to the non-folded state, the inner screen is controlled to continue to display the non-lock screen.

6. The electronic device display method according to claim 1, wherein the preset condition further comprises a posture of the foldable body being in a non-horizontal state.

7. The electronic device display method according to claim 6, further comprising:
determining whether an absolute value of a change amount of a roll angle of the foldable body is greater than a first preset angle; and
based on the absolute value of the change amount of the roll angle of the foldable body being greater than the first preset angle, determining that the posture of the foldable body is in the non-horizontal state, wherein a rotation axis corresponding to the roll angle is parallel to a folding axis of the foldable body.

8. The electronic device display method according to claim 7, before the determining whether the absolute value of the change amount of the roll angle of the foldable body is greater than the first preset angle, the method further comprises:
determining whether an absolute value of a pitch angle of the foldable body is less than a second preset angle, or determining whether a component value of an acceleration sensor in the foldable body in a gravity direction is less than a preset threshold; and
based on the absolute value of the pitch angle of the foldable body being less than the second preset angle, or the component value of the acceleration sensor in the foldable body in the gravity direction being less than the preset threshold, determining whether the absolute value of the change amount of the roll angle of the foldable body is greater than the first preset angle, wherein a rotation axis corresponding to the pitch angle is perpendicular to the rotation axis corresponding to the roll angle.

9. The electronic device display method according to claim 8, further comprising:

based on the absolute value of the pitch angle of the foldable body not being less than the second preset angle, or the component value of the acceleration sensor in the foldable body in the gravity direction not being less than the preset threshold, determining, within the preset time after the protective cover reaches the preset position, whether the foldable body is switched to the non-folded state.

10. The electronic device display method according to claim 6, wherein based on the foldable body being in a horizontal state, the electronic device is controlled to be in the screen locked state.

11. The electronic device display method according to claim 1, after the protective cover reaches the preset position with respect to the outer screen, the method further comprises:
controlling the outer screen to display a small-window interface.

12. The electronic device display method according to claim 11, after determining, within the preset time after the protective cover reaches the preset position, that the foldable body is switched to the non-folded state, the method further comprises:
controlling the outer screen to exit the small-window interface.

13. An electronic device, comprising:
a foldable body;
an outer screen;
an inner screen, wherein the outer screen and the inner screen are respectively located on two opposite surfaces of the foldable body;
a processor; and
a memory configured to store executable instructions that, when executed by the processor, cause the electronic device to implement the method according to claim 1.

14. The electronic device according to claim 13, wherein the preset condition further comprises: the electronic device is being in the screen non-locked state.

15. The electronic device according to claim 14, wherein the preset condition further comprises: a posture of the foldable body is in a non-horizontal state.

16. The electronic device according to claim 13, wherein after the protective cover reaches the preset position with respect to the outer screen, the method further comprises:
controlling the outer screen to display a small-window interface.

17. An electronic device display method, wherein an electronic device comprises a foldable body, an outer screen, and an inner screen, wherein the outer screen and the inner screen are respectively located on two opposite surfaces of the foldable body, and wherein the foldable body is in a folded state and the outer screen displays a non-lock screen, the method comprising:
detecting whether a protective cover approaches the outer screen and reaches a preset position with respect to the outer screen, wherein a signal transmitting component is disposed on the protective cover, and a signal sensing component is disposed on the outer screen;
based on determining that the protective cover reaches the preset position with respect to the outer screen, determining, within a preset time after the protective cover reaches the preset position, whether the foldable body is switched to a non-folded state, wherein determining that the protective cover reaches the preset position with respect to the outer screen is based on the signal sensing component sensing a signal transmitted by the signal transmitting component when the protective cover approaches the outer screen; and based on determining that the foldable body is switched to the non-folded state, controlling the inner screen to continue to display the non-lock screen.

18. An electronic device, comprising:
a foldable body;
an outer screen;
an inner screen, wherein the outer screen and the inner screen are respectively located on two opposite surfaces of the foldable body;
a processor; and
a memory configured to store executable instructions that, when executed by the processor, cause the electronic device to implement the method according to claim 17.

19. The electronic device according to claim 18, wherein after the protective cover reaches the preset position with respect to the outer screen, the method further comprises:
controlling the outer screen to display a small-window interface.

* * * * *